US008249885B2

(12) United States Patent
Berkowitz et al.

(10) Patent No.: US 8,249,885 B2
(45) Date of Patent: Aug. 21, 2012

(54) KNOWLEDGE-BASED E-CATALOG PROCUREMENT SYSTEM AND METHOD

(76) Inventors: Gary Charles Berkowitz, Centennial, CO (US); Dmitry Serebrennikov, Los Alamos, NM (US); Brian Michael Roe, Los Alamos, NM (US); Charles Christopher Wurtz, Los Alamos, NM (US)

( * ) Notice: Subject to any disclaimer, the term of this patent is extended or adjusted under 35 U.S.C. 154(b) by 1335 days.

(21) Appl. No.: 10/215,109

(22) Filed: Aug. 8, 2002

(65) Prior Publication Data
US 2003/0061122 A1    Mar. 27, 2003

Related U.S. Application Data

(60) Provisional application No. 60/310,915, filed on Aug. 8, 2001.

(51) Int. Cl.
*G06Q 10/00* (2012.01)
*G06Q 30/00* (2006.01)

(52) U.S. Cl. .......................... 705/1.1; 705/27.1
(58) Field of Classification Search .................... 705/27
See application file for complete search history.

(56) References Cited

U.S. PATENT DOCUMENTS

| | | | |
|---|---|---|---|
| 4,462,075 A | | 7/1984 | Mori et al. |
| 4,468,728 A | * | 8/1984 | Wang ................................ 707/1 |
| 5,072,371 A | | 12/1991 | Benner et al. |
| 5,088,031 A | | 2/1992 | Takasaki et al. |
| 5,101,346 A | | 3/1992 | Ohtsuki |
| 5,404,512 A | * | 4/1995 | Powers et al. .......................... 1/1 |
| 5,404,513 A | * | 4/1995 | Powers et al. .......................... 1/1 |
| 5,442,784 A | * | 8/1995 | Powers et al. .......................... 1/1 |
| 5,515,488 A | * | 5/1996 | Hoppe et al. .................. 345/440 |
| 5,553,291 A | | 9/1996 | Tanaka et al. |
| 5,577,241 A | * | 11/1996 | Spencer ................................ 1/1 |
| 5,692,193 A | | 11/1997 | Jagannathan et al. |
| 5,802,290 A | | 9/1998 | Casselman |
| 5,911,138 A | * | 6/1999 | Li et al. ................................ 1/1 |

(Continued)

OTHER PUBLICATIONS

Anonymous, Information found on the website of Veriscape, Sep. 18, 2000, pp. 9.*

(Continued)

*Primary Examiner* — Asfand Sheikh

(57) ABSTRACT

A flexible, intelligent electronic procurement method and system that emulates and learns from the adaptive behavior of a user trying to find a product in an electronic catalog. In contrast to existing methods and systems, the invention allows for searching heterogeneous catalogs in virtually any format, and does not require pre-defined hierarchies, nor the pre-loading of vendor catalog contents, nor the scrubbing of vendor data. It does not impose fixed structures on the user, it does not require the user to start 'from scratch' when looking for a new item, and it does not force the user to think like someone else. Instead, the invention allows the user to choose his own way to navigate catalogs of items, and then, by remembering successful search scenarios, and storing that knowledge in a dynamic, growing database (or 'forest') of collected search paths, or 'find-trees', the invention grows and improves, that is, it evolves organically over time. As the collection of find-trees can be accessed by other users, the utility of the invention increases over time once implemented in a given environment. Further, the invention is able to do this in a time- and space-efficient manner (that is, without the forest growing too tangled, dense or large) not only because of its method and architecture, but also through the use of autonomous background processes that continually prune and update the tree structures for optimum storage and navigation.

45 Claims, 19 Drawing Sheets

U.S. PATENT DOCUMENTS

| | | | |
|---|---|---|---|
| 5,925,102 | A | 7/1999 | Ellert |
| 5,935,216 | A | 8/1999 | Benner et al. |
| 5,944,779 | A | 8/1999 | Blum |
| 5,944,783 | A | 8/1999 | Nieten |
| 5,987,497 | A | 11/1999 | Allgeier |
| 6,003,065 | A | 12/1999 | Yan et al. |
| 6,003,137 | A | 12/1999 | Kawasaki |
| 6,012,055 | A * | 1/2000 | Campbell et al. ............ 1/1 |
| 6,047,283 | A * | 4/2000 | Braun ............... 707/3 |
| 6,119,101 | A * | 9/2000 | Peckover ............ 705/26 |
| 6,269,391 | B1 | 7/2001 | Gillespie |
| 6,327,593 | B1 * | 12/2001 | Goiffon ............... 1/1 |
| 6,397,212 | B1 * | 5/2002 | Biffar ............... 707/5 |
| 6,411,950 | B1 * | 6/2002 | Moricz et al. ............ 707/3 |
| 6,421,675 | B1 * | 7/2002 | Ryan et al. ............ 707/100 |
| 6,453,312 | B1 * | 9/2002 | Goiffon et al. ............ 1/1 |
| 6,484,162 | B1 * | 11/2002 | Edlund et al. ............ 1/1 |
| 6,484,190 | B1 * | 11/2002 | Cordes et al. ............ 715/207 |
| 6,615,207 | B1 * | 9/2003 | Lawrence ............ 1/1 |
| 6,732,088 | B1 * | 5/2004 | Glance ............... 1/1 |
| 6,769,033 | B1 * | 7/2004 | Bass et al. ............ 709/246 |
| 6,839,714 | B2 * | 1/2005 | Wheeler et al. ............ 707/102 |
| 6,859,455 | B1 * | 2/2005 | Yazdani et al. ............ 370/392 |
| 7,260,780 | B2 | 8/2007 | Ma |
| 7,668,811 | B2 | 2/2010 | Janssens et al. |
| 7,756,750 | B2 | 7/2010 | Venkiteswaran |
| 7,774,191 | B2 | 8/2010 | Berkowitz et al. |
| 2001/0051893 | A1 * | 12/2001 | Hanai et al. ............ 705/10 |
| 2002/0016794 | A1 * | 2/2002 | Keith, Jr. ............ 707/201 |
| 2002/0156695 | A1 * | 10/2002 | Edwards ............ 705/26 |
| 2004/0030694 | A1 * | 2/2004 | Tokumo et al. ............ 707/5 |
| 2004/0128155 | A1 | 7/2004 | Vaidyanathan et al. |
| 2005/0193029 | A1 | 9/2005 | Rom et al. |
| 2005/0222987 | A1 | 10/2005 | Vadon |
| 2005/0273706 | A1 | 12/2005 | Manber et al. |
| 2005/0289168 | A1 * | 12/2005 | Green et al. ............ 707/101 |
| 2008/0027830 | A1 | 1/2008 | Johnson et al. |
| 2008/0040220 | A1 | 2/2008 | Levy et al. |
| 2008/0059297 | A1 | 3/2008 | Vallier et al. |
| 2008/0221915 | A1 | 9/2008 | Berkowitz et al. |
| 2009/0094227 | A1 | 4/2009 | Berkowitz et al. |
| 2010/0191616 | A1 | 7/2010 | Berkowitz et al. |
| 2011/0004534 | A1 | 1/2011 | Venkiteswaran |

OTHER PUBLICATIONS

Anonymous, Information found on the website of openp2p, May 13, 2001, pp. 2.*

* cited by examiner

Root Node

Tree Branch Nodes

Branch Leaf Node

Catalog Model

User Management

Privileges

KNOWLEDGE-BASED E-CATALOG PROCUREMENT SYSTEM AND METHOD

CROSS-REFERENCE TO RELATED APPLICATIONS

This application incorporates by reference, in whole, the provisional application:

Knowledge-Based E-Catalog Procurement System and Method, Application No. 60/310,915, Filing Date Aug. 8, 2001, Inventors G. Berkowitz, C. Wurtz, B. Roe.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention is directed toward the field of electronic procurement systems. More specifically, the technology described in this patent application relates to a knowledge-based e-catalog procurement system and method.

2. Description of the Related Art

One of the most difficult problems facing Business-to-Business (B2B) Internet commerce is the lack of consistent nomenclature across suppliers. Successful business-to-consumer Internet vendors, such as Amazon.com, enjoy common identifiers in the form of International Standard Book Numbers (ISBN), for example, and Universal Price Codes (UPC), as another example. In the B2B arena, however, common identifiers are non-existent. Although the Internet provides access to a large number of supplier catalogs, the effort required to locate a particular item is highly labor intensive.

Current technology approaches available to solve the B2B business problem discussed above include: (1) creating a common nomenclature mapping (e.g., Aspect); (2) utilizing specialized search technology, such as available from Ariba, Inc.; (3) standardizing and or scrubbing vendor data; and (3) using relational technology. All of these approaches suffer from several disadvantages, however.

In the case of nomenclature mapping, such as Aspect, the solution is very expensive. Additionally, data must be preloaded into the system, a task representing a significant cost in data-entry person-hours. Finally, this solution is costly to maintain. Each of the other approaches also suffers from limitations, as further outlined at pages 4-5 of the IntelleCat Functional Specification, which is included in the DETAILED DESCRIPTION. The IntelleCat Functional Specification provides a detailed functional description of a product called IntelleCat, which is the preferred embodiment of the present invention, and which is a knowledge-based e-catalog procurement system.

BRIEF SUMMARY OF THE INVENTION

The invention, termed IntelleCat, is a knowledge-based e-catalog procurement assistant. It was created to solve problems encountered in the area of catalog management in electronic procurement systems. IntelleCat is intended to work closely with a major e-procurement system (e.g. Ariba, CommerceOne, Oracle) or as a stand-alone ordering system. It empowers procurement professionals to successfully search and find, retain purchasing expertise, and consistently implement best-practice procurements on a global scale.

One of the most difficult problems facing B2B Internet commerce is the lack of consistent nomenclature across suppliers. Successful business-to-consumer Internet vendors, such as Amazon.com™, enjoy common identifiers in the form of International Standard Book Numbers (ISBN) and Universal Price Codes (UPC). In the B2B arena, common identifiers are non-existent. Although the Internet provides access to a large number of supplier catalogs (approximately 40-50% currently, with up to 90% coming online over the next 1-2 years), the effort required to locate a particular item is highly labor intensive.

Current technology approaches available to solve the B2B business problem include:

1) Creating a common nomenclature mapping (e.g. Aspect)
2) Utilizing Ariba's search technology
3) Standardizing and/or scrubbing vendor data
4) Using relational technology In the case of Aspect, the solution is expensive. At over $4.00 per record, a one million record database costs $4M just to populate. Additionally, data must be preloaded, a task that represents a significant cost in data-entry person-hours. Finally, the solution is costly to maintain, because as vendor catalogs change over time, additional data entry is required to change underlying databases.

While the workflow features of the Ariba product have been well received, difficulties have been encountered with Ariba's catalog search technology. Users have found it difficult to restrict searches and locate parts in a reasonable amount of time, which has led to user frustration. Furthermore, Ariba's searches are only as good as the vendor catalog. If a catalog is well defined, the search executes reasonably well. Most catalogs, however, do not fall into the 'well defined' category.

Second, corporate purchases have experienced tremendous difficulty getting catalogs loaded into their procurement system. The primary reason is that the procurement system requires the catalog data be in a specific format, but the vendors are not supplying the catalogs in this format. Corporate purchasing then has the choice of either changing the format themselves (a burdensome task), or having very few online catalogs.

To design a relational database solution to solve the problem is almost impossible for two reasons. To represent an average corporation's part and location data, the database schema would have to provide an extremely long relational tuple to support an arbitrary number of attributes. While current relational technology can support this, it is impractical in terms of performance. In order to capture the 'shopping process', a dynamic database schema would need to self-modify as users interact with the system. Current relational technology does not support the latter.

Optimally, a solution was needed that is technologically feasible, functionally adaptive, easy to use, and cost-effective.

The solution needed to allow the data representations, which describe the item to be purchased, to be arbitrarily flexible. These data representations needed to be able to change over time without requiring onerous system administration. Additionally, the solution should capture the shopping process. Once a specific item has initially been located, subsequent searches for a similar, or an identical item, needed to be very fast and painless for the user. And lastly, this all needs to be accomplished without having to scrub vendor data.

The present invention's solution to the business problem is twofold. First, IntelleCat allows a much greater flexibility with regard to the format of the catalog data being loaded. Catalogs can be loaded and searched even if they are missing data fields. Furthermore, IntelleCat supports a virtually infinite variety of catalog data formats. Second, IntelleCat has a very intuitive and flexible search mechanism that also captures and shares search knowledge among all users of the system. Both aspects of IntelleCat are based on the idea of organic data structures that grow and adapt over time as they are used.

IntelleCat emulates the adaptive behavior of a user trying to find a product. Remembering the successful searches of corporate purchasers, IntelleCat evolves 'organically' over time. Acting as a companion to existing search procedures, it grows a 'forest' of path-dependent trees that represent successful search scenarios. As a result, it evolves from being "completely devoid of utility" to being "enormously useful".

Different users may have different ways of thinking about the search hierarchy. IntelleCat stores all versions of trees that lead to the same result. The user is not, therefore, burdened by having to think like someone else. The consequence of this level of flexibility is that IntelleCat creates a rather large, complex forest of tree structures. IntelleCat is able to do this in a time- and space-efficient manner not only because of its proprietary architecture, but also through the use of various autonomous processes (named daemons) running behind the scenes, that continually prune and update the structures for optimum storage and navigation.

The IntelleCat solution, in summary:
Requires no pre-loading of index data
Requires no vendor data scrubbing
Imposes no fixed structures on users
Does not require existing systems to change
Evolves alongside current procedures
Is dynamic, flexible, and adaptive
Is completely scalable and extensible IntelleCat, while initially ignorant of corporate purchasing searches, will, over time, relieve the burden of painstaking manual searches for the majority of purchase requisitions.

DETAILED DESCRIPTION OF THE INVENTION

Figure 1:
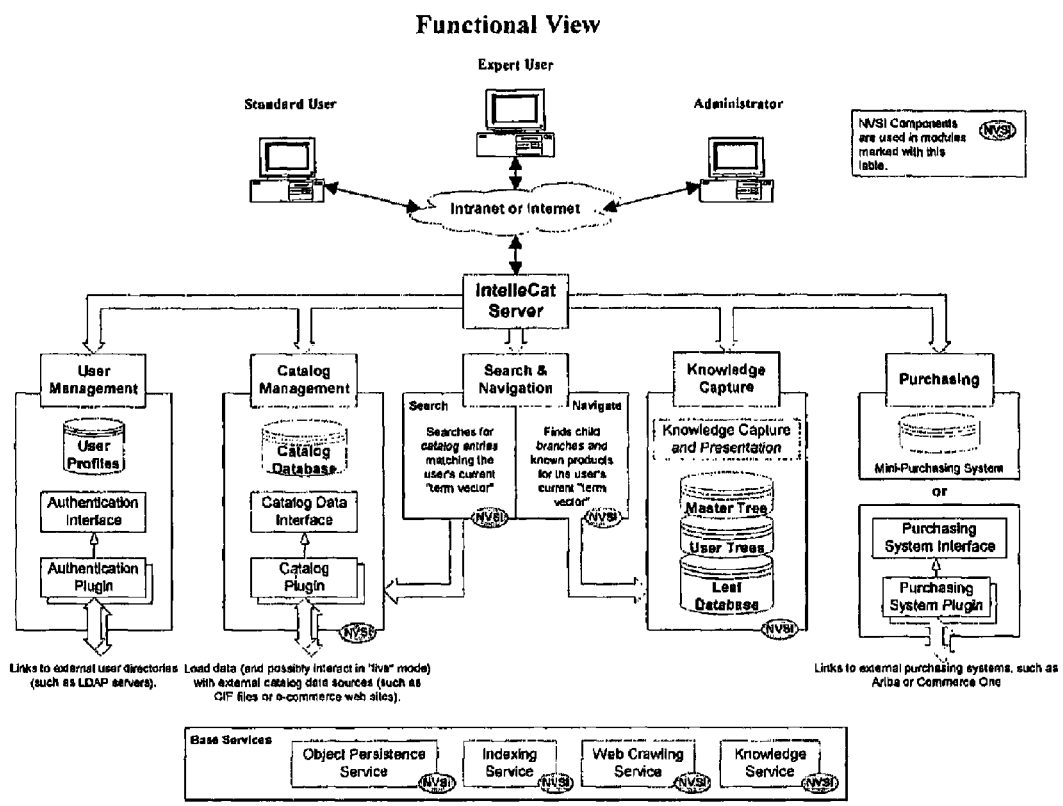
FIG. 1 is a schematic block diagram representation of the software architecture comprising the present invention.

In one embodiment, termed IntelleCat, the present invention is a knowledge-based e-catalog procurement assistant. It was created to solve problems encountered in the area of catalog management in electronic procurement systems. IntelleCat is intended to work closely with a major e-procurement system (e.g. Ariba, CommerceOne, Oracle) or as a stand-alone ordering system. It empowers procurement professionals to successfully search and find, retain purchasing expertise, and consistently implement best-practice procurements on a global scale. One of the most difficult problems facing B2B Internet commerce is the lack of consistent nomenclature across suppliers. Successful business-to-consumer Internet vendors, such as Amazon.com, enjoy common identifiers in the form of International Standard Book Numbers (ISBN) and Universal Price Codes (UPC). In the B2B arena, common identifiers are non-existent. Although the Internet provides access to a large number of supplier catalogs (approximately 40-50% currently, with up to 90% coming online over the next 1-2 years), the effort required to locate a particular item is highly labor intensive.

Current technology approaches available to solve the B2B business problem include: creating a common nomenclature mapping (e.g. Aspect), utilizing Ariba's search technology, standardizing and/or scrubbing vendor data, using relational technology.

In the case of Aspect, the solution is expensive. At over $4.00 per record, a one million record database costs $4M just to populate. Additionally, data must be preloaded, a task that represents a significant cost in data-entry person-hours. Finally, the solution is costly to maintain, because as vendor catalogs change over time, additional data entry is required to change underlying databases.

While the workflow features of the Ariba product have been well received, difficulties have been encountered with Ariba's catalog search technology. Users have found it difficult to restrict searches and locate parts in a reasonable amount of time, which has led to user frustration. Furthermore, Ariba's searches are only as good as the vendor catalog. If a catalog is well defined, the search executes reasonably well. Most catalogs, however, do not fall into the 'well defined' category.

Second, corporate purchases have experienced tremendous difficulty getting catalogs loaded into their procurement system. The primary reason is that the procurement system requires the catalog data be in a specific format, but the vendors are not supplying the catalogs in this format. Corporate purchasing then has the choice of either changing the format themselves (a burdensome task), or having very few online catalogs.

To design a relational database solution to solve the problem is almost impossible for two reasons. To represent an average corporation's part and location data, the database schema would have to provide an extremely long relational tuple to support an arbitrary number of attributes. While current relational technology can support this, it is impractical in terms of performance. In order to capture the 'shopping process', a dynamic database schema would need to self-modify as users interact with the system. Current relational technology does not support the latter.

Optimally, a solution was needed that is technologically feasible, functionally adaptive, easy to use, and cost-effective.

The solution needs to allow the data representations, which describe the item to be purchased, to be arbitrarily flexible. These data representations need to be able to change over time without requiring onerous system administration. Additionally, the solution should capture the shopping process. Once a specific item has initially been located, subsequent searches for a similar, or an identical item, need to be very fast and painless for the user. And lastly, this all needs to be accomplished without having to scrub vendor data.

IntelleCat's solution to the business problem is twofold. First, IntelleCat allows a much greater flexibility with regard to the format of the catalog data being loaded. Catalogs can be loaded and searched even if they are missing data fields. Furthermore, IntelleCat supports a virtually infinite variety of catalog data formats. Second, IntelleCat has a very intuitive and flexible search mechanism that also captures and shares search knowledge among all users of the system. Both aspects of IntelleCat are based on the idea of organic data structures that grow and adapt over time as they are used.

The simplest way to explain Error! Reference source not found. is to consider the following analogy:

Imagine that you own a large hardware store and have just hired a 19-year-old clerk. This clerk knows nothing about hardware or the layout of the store, but is very intelligent and has a perfect memory.

The first customer approaches him and the clerk asks, "Can I help you?" but at this early stage the clerk can't really help or even do more than tag along while the customer shops.

The customer wants to buy a vacuum pump. The clerk doesn't know what a vacuum pump is, nor where pumps are located, so the customer browses the store until he finds the vacuum pump he wants. Now the clerk is able to 'prune' the search for any subsequent vacuum pump requests. In other words, he can forget all of the incorrect aisles that were searched and he knows the most direct path from the front counter to the location of vacuum pumps.

The next time a customer asks for a pump, the clerk asks: "Do you want a vacuum pump, or some other kind of pump?" The customer says: "I'm looking for a fluid pump." The clerk knows the way to the aisle where pumps are displayed and takes the customer there. At this point, it is up to the customer to find the correct pump. As before, the clerk learns something about the layout of the store and about the various items it contains.

After the clerk works in the store for a few months, he knows a great deal about pumps. When someone asks for a pump, he can respond by inquiring "gas, fluid, vacuum, or other?" The customer says, "vacuum" and the clerk can ask, "oil diffusion, turbomolecular, roughing, backing, or other?" The customer says "turbomolecular". The clerk now asks, "millitorr, microtorr, nanotorr or other?" The customer says, "microtorr", and the clerk immediately guides the customer to the correct aisle and shelf IntelleCat emulates the adaptive behavior of the clerk. Remembering the successful searches of corporate purchasers, IntelleCat evolves 'organically' over time. Acting as a companion to existing search procedures, it grows and stores a 'forest' of path-dependent trees (also termed throughout this description as 'find trees', 'find paths', or 'search trees') that represent successful search scenarios. As a result, it evolves from being "completely devoid of utility" to being "enormously useful".

Figure 2:
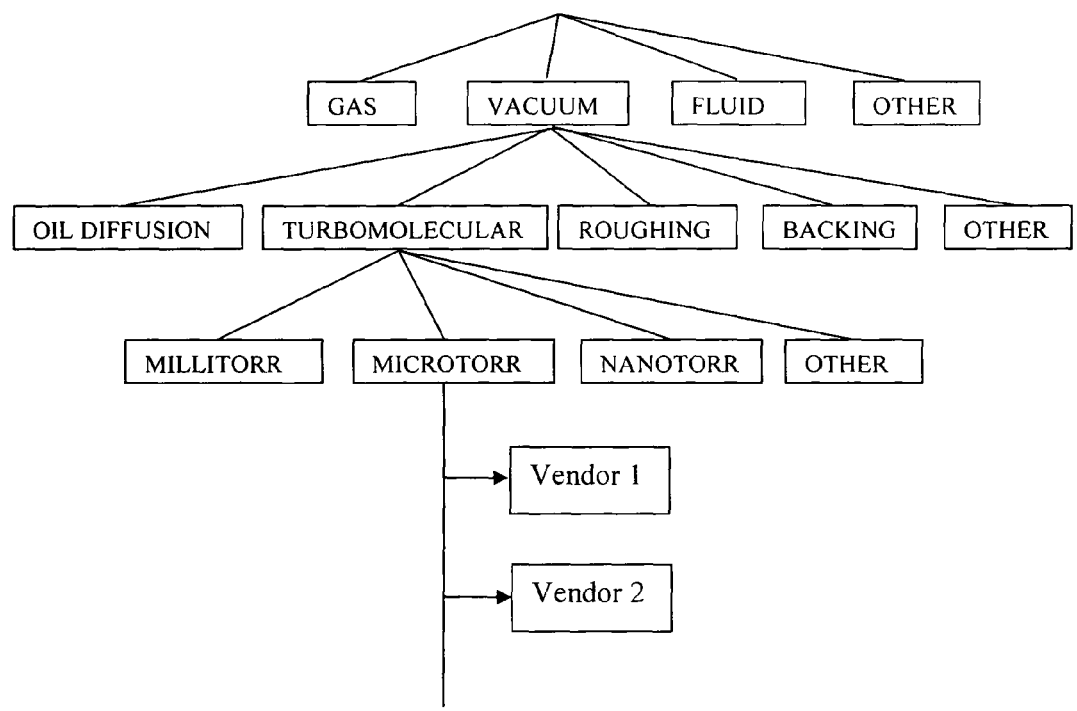
FIG. 2 illustrates an example of how catalog-item knowledge acquired by the invention is represented as a find-tree.

The knowledge that IntelleCat acquires in the area of pumps (as demonstrated in the clerk analogy) is represented in FIG. 2. At the leaf level (vendor 1, vendor 2 and so on), the actual images of the catalog pages are found, along with vendor information, parts previously ordered, price, and so on.

As the number of purchasers using the system increases, the trees within IntelleCat grow, capturing user expertise. To illustrate this point, consider the following scenario involving three 'company' employees:

The first time Bob, a purchaser in New Jersey, enters the system to order a pump, he is asked via the user interface to enter a category descriptor. He types, "pump". He is then asked by the interface for the next level descriptor or attribute. He may enter "vacuum". Again, he is asked for another descriptor. If he can't think of one, he asks IntelleCat to perform a search (which he can do at any point in the process) and IntelleCat invokes a constrained search against the vendor catalogs.

At this point, Bob is presented with an overwhelming number of pages, since his search has been fairly nonspecific. He scans a few vendor product pages, and quickly realizes that there are a number of qualifiers he either didn't know about or simply forgot to use. He clicks back on the tree at any point, adds qualifiers in any order he chooses, and then again asks for a search. This time, he gets only a handful of pages. He scans them, chooses a vendor, and completes a Purchase Requisition.

Figure 3:
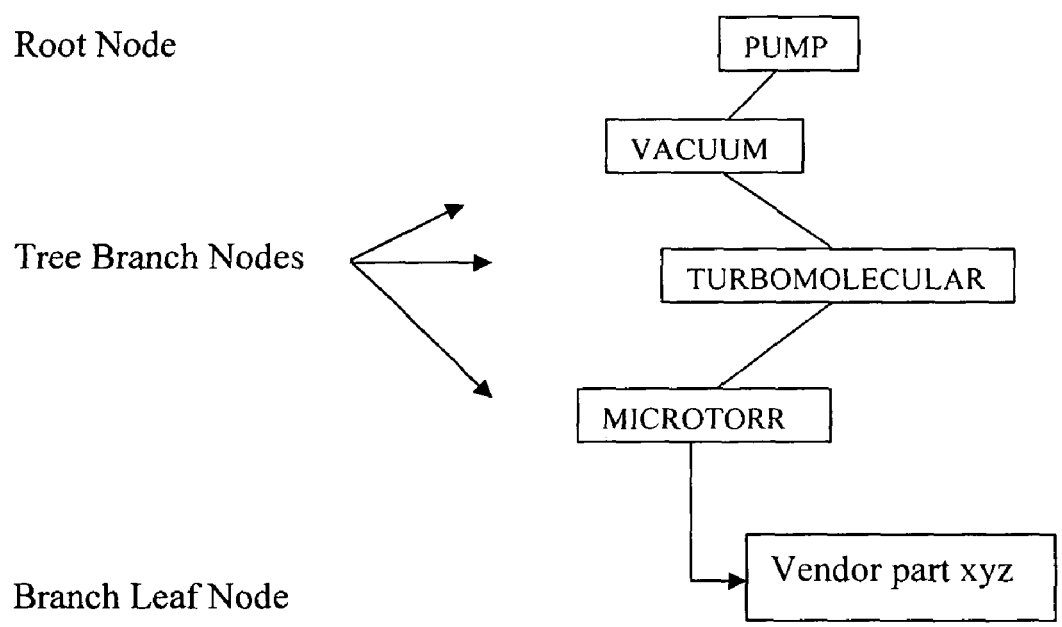
FIG. 3 illustrates a typical example of a user's particular search and find tree.

FIG. 3 illustrates Bob's search and find path. Once the search is concluded, IntelleCat discards any extraneous branches that may have been created during faulty searches and it 'remembers' the user's successful search path. At this point in time, the search path really becomes a find path. This is so because the next time the user wishes to place the same order, IntelleCat can find the part painlessly, i.e., without the need to go through the steps to search out the part again, and without any delays. The search is almost instantaneous because the find path with the resulting part and all of the information needed for the Purchase Requisition is 'cached' in the memory of a local server.

The following day, Berte, an purchaser in Germany, wants to find a similar pump. She enters the system, types "pump" (note: in some versions of the system she is able to interact with the system in German and IntelleCat transparently maps the English-German translation), and immediately she is shown two options, "Vacuum" and "Other", based on Bob's previous search. If she wants a vacuum pump, the system then displays the next level, and so on. If she wants the same pump as Bob, whether or not she is aware of Bob's purchase, all she has to do is select each choice, and the process completes quickly. If at some point she wants to digress from the suggested path (Bob's path), she selects "Other", and the system constructs a new branch of the tree for Berte. The results of her successful search are saved, forming a more robust tree that now represents the results of the searches performed by both Bob and Berte.

Next, when Jacques in France begins a search for a pump, his tree of suggestions will be even more complete.

In a few months, if Bob in New Jersey wants to purchase the same vacuum pump he found before, his job is easy. After typing "pump", IntelleCat scans Bob's User Profile 'ordering history' to see if Bob has ever ordered a pump. When the system finds that he has, Bob is presented with a list of previously ordered pumps (consisting of one pump in this case). He selects the pump and is taken directly to the proper catalog page.

Different users may have different ways of thinking about the search hierarchy. IntelleCat stores all versions of trees that lead to the same result. The user is not, therefore, burdened by having to think like someone else. The consequence of this level of flexibility is that IntelleCat creates a rather large, complex forest of tree structures. IntelleCat is able to do this in a time- and space-efficient manner not only because of its proprietary architecture, but also through the use of various autonomous processes (named daemons) running behind the scenes, that continually prune and update the structures for optimum storage and navigation.

The IntelleCat solution, in summary: requires no pre-loading of index data, requires no vendor data scrubbing, imposes no fixed structures on users, does not require existing systems to change, evolves alongside current procedures, is dynamic, flexible, and adaptive, is completely scalable and extensible.

IntelleCat, while initially ignorant of corporate purchasing searches, will, over time, relieve the burden of painstaking manual searches for the majority of purchase requisitions.

A glossary of terms for the present invention is shown in the TABLE 1:

TABLE 1

| | |
|---|---|
| Branch | A single connection between nodes, branches define the structure of the tree. |
| Complete path | A sequence of nodes and branches starting from a root node and ending with a leaf node. |
| Master Tree Space | The set of search trees shared by all shoppers. |
| MRO | Maintenance, repair and operation |
| Node | Represents a single word or phrase in a semantic tree. |
| NVSI | Netcentric Virtual Supercomputing Infrastructure, the infrastructure component software on which some IntelleCat functionality is based. |
| Path | A sequence of nodes and branches |
| Partial path | A sequence of nodes and branches starting from a root node and not ending with a leaf node. |
| Partial Tree | A tree containing one or more partial paths. Note that this implies that a partial tree contains a root node. |
| Shopping | Any combination of navigating existing trees, searching catalog indexes and browsing catalog pages. |
| Sub-tree | One or more paths with a common parent node. Note that this does not imply the presence of a root node. |
| Term Vector | The path being used to search for a product; can be delimited with commas. |
| Tree | A set of search terms having a root node and one or more branch and/or leaf nodes |

The attraction of e-procurement to a corporation is simple: The administrative overhead of purchasing items for a company is high. Many estimates put the price at $175/purchased item, regardless of whether the item is a box of pens or a diesel generator. E-procurement systems promise to use automated workflow and electronic communications to reduce this cost to a range of $25/item.

Most existing e-procurement systems have a serious flaw in their approach to electronic catalogs, in that the system vendors have largely assumed that vendors will be willing to put their catalog data into the appropriate format for the e-procurement system. While some vendors have been willing to do this, many have not. Thus, the products a company purchases do not exist within their electronic catalogs. Worse yet, the items may exist but cannot be found by the end-users due to confusing or difficult search mechanisms. The result is that the e-procurement systems do not provide the expected return on investment, because their catalogs contain only a fraction of the total number of items the company purchases. Items not found in the e-procurement system must be purchased the 'old' way, where no cost reduction is possible.

IntelleCat solves both problems. It provides a new and much less restrictive approach to loading and storing electronic catalogs. IntelleCat also provides a highly intuitive search interface that makes it much easier for users to find the items they want. Additionally, the search interface automatically captures information about successful product searches and shares this data among all users of the system. This makes it even easier for successive users of the system to find the same or similar items as were found in previous product searches.

Some additional terms are defined:

Users of IntelleCat fall into one of three categories: Shoppers, Administrators and Data Specialists. Each category of user is able to perform different functions.

An IntelleCat Shopper can search catalogs and order items.

The IntelleCat Administrator is responsible for maintaining the system, including administering users, existing search trees and catalogs.

The IntelleCat Data Specialist performs specific functions for the purchasing department related to catalog data, such as defining specific items that can be purchased from captured web pages, and otherwise 'enriching' catalog data.

The Content Manager (CM), a part of the present invention, supports all functionality related to loading and managing electronic content. In IntelleCat the CM specifically is geared towards the content of electronic catalogs. However, all of the key underlying mechanisms (indexing, searching, browsing and assist) are equally applicable to other types of content, such as text knowledge bases, databases or even the contents of a typical intranet (e.g., HTML, Word, Excel, Powerpoint, Access and Acrobat files).

The Content Manager must support two basic types of catalog data: Record-based and page-based. The primary record-based data format is CIF (Catalog Interchange Format). Punch-out is a second type of popular record-based format. The primary page-based catalog format is HTML (web pages). The Content Manager is designed around a data content plug-in, so that new catalog data formats can be easily supported by writing a small amount of code that recognizes the new format and adapts it to the 'generic content' components of the system.

IntelleCat, a part of the present invention, is an intelligent search engine specifically optimized for electronic catalog data. IntelleCat also handles both record-based and page-based catalogs. It indexes key fields (such as name, description and part number) of a catalog immediately after the catalog is loaded. This enables the end-user to search on any meaningful, indexed attribute of the catalog data. IntelleCat includes the IntellAssistant, a part of the present invention, which assists the shopper in quickly narrowing down a search to a few items by suggesting descriptive words that are relevant to the current context.

IntelleCat, a part of the present invention, is an intelligent data store that builds semantic tree representations of successful catalog searches performed by IntelleCat. IntelleCat provides extremely efficient storage of this information by using NVSI to implement a data structure that corresponds to the semantic tree structure of the catalog terms. These tree structures are organically 'grown' over time to create a term hierarchy.

Trees can be selectively shared between all users of the system, groups of users or can be saved only for a single user. The set of trees shared between users is called the Master Tree Space, and the set of trees belong to a particular user is called the User Tree Space.

IntelleCat, a part of the present invention, is an intelligent matching engine that gradually builds a thesaurus of e-catalog product descriptions. IntelleCat supports a completely flexible, organically evolving semantic tree structure. Using the IntelleCat search interface, it is therefore possible for users to create multiple paths that lead to the same item. While this may intuitively seem 'incorrect', particularly from the perspective of relational database designs, it is actually a feature of the system, in that users are not forced into a single, 'correct' approach.

When multiple paths describing the same item exist and differ only by a single word, it is implied that these different words are synonyms. IntelleCat automatically detects these synonyms in the trees and notates them as such. IntelleCat automatically utilizes synonyms during searching, automatically helping users familiar with one synonym to find items described by the others.

The IntelleCat User Interface (UI) is implemented within a browser environment. This has two primary benefits: Browsers are already widely known and well understood a user interface environments, plus it is very easy to distribute the application to a wide number of users, as only the servers require local software updates.

IntelleCat is unique in that its UI automatically captures and shares knowledge as it is used. Users search for catalog items by interactively adding search terms to restrict the search results until the target item is found. These terms are remembered during the search process, as the UI is designed to capture the search and navigation choices made by the user as automatically as possible. These search paths form the semantic trees, which are the core of the IntelleCat product. When the user finds the desired item (as indicated by a purchase), the system records the specific terms used to find the item and shares this information with other IntelleCat users.

The Purchasing Gateway is an interface to the primary purchasing system. Requisitions are created by IntelleCat and then exported to the purchasing system for further processing.

Many companies have more than one internal system involved in some aspect of purchasing. Such systems include e-procurement systems, asset management systems, and inventory management systems. The systems often use different part numbers to refer to the same parts, particularly if the company grows by acquisition and does not do a thorough job of integrated software systems. This is problematic for a number of reasons: The company is unable to negotiate volume purchase agreements with the part vendors, as they do not know how much the company buys from the vendor at the aggregate level. It also results in extra costs related to capital expenditures for inventory, as two geographically close divisions may keep the same expensive part on hand.

The Part Number Cross-Reference is a database of related part numbers. At certain key steps in the purchasing process, it is possible to establish a mapping of one part number to another.

IntelleCat detects and remembers these mappings, so that multiple internal part numbers can be related to the same vendor or manufacturer part number. These relationships are built up over time as the 'mapping events' occur and are recorded. This cross-reference allows the company to address the problems discussed in the previous paragraph.

The structure of the data relationship created by the part number cross-reference is shown in TABLE 2:

TABLE 2

| Manufacturer ID | Manufacturer Part Number | Site 1 ID | Site 1 Part # | Site 2 ID | Site 2 Part # | ... | Site N ID | Site N Part # |
|---|---|---|---|---|---|---|---|---|

The Content Manager (CM) supports all functionality related to loading and managing electronic content. As indicated in the previous chapter, the generic Content Manager component is adapted specifically for use with electronic catalogs.

In addition to data about items to be purchased, catalogs can also contain presentation content. Different catalog formats have different amounts of one versus the other. For example, a CIF file is mostly data, an e-commerce web site or a CD-ROM with PDF files is mostly presentation, and a cXML site is a combination of both. The CM defines a framework that can accommodate all of these different types of catalogs. Its objective is to capture as much content as possible in order to be able to provide richer user experience and thus make purchasing easier and more accurate.

The only IntelleCat users that can access the CM are Administrators. They are responsible for all catalog-level operations in the CM.

A Catalog Set is a set of similar or related catalogs that generally need to be accessed by a specific group of users. Its purpose is to simplify the management of product visibility to the appropriate personnel. For example, a company may have a set of catalogs containing general office supplies (e.g., Office Max). This Catalog Set would typically be visible to most personnel within the company. There may be another set of catalogs containing automotive parts and tools, and this set would only be visible to personnel in the motor pool. Catalog Set functionality includes the ability to create and delete sets, add and remove catalogs from sets, change sets and define the users and groups of users that have access to specific sets.

Catalog Maintenance functions include creating new catalogs, loading new versions (editions) of existing catalogs, changing the active edition of a catalog and deleting a catalog. Maintenance functions also include the Catalog Set operations described in the previous section.

In order to be available to end users for shopping, a catalog must be defined, loaded and assigned to a set.

After a catalog has been loaded, IntelleCat also supports additional tools to remove items and/or pages from the initial data set to create a modified catalog data set. The administrator has a choice of making the initial catalog visible to shoppers or waiting until the catalog has been edited.

There are two general types of catalog formats: Record-based and page-based. Record-based catalogs are typically geared towards being read (processed) by a computer, whereas page-based catalogs are typically geared towards being read by a human. CIF is an example of a record-based catalog, while a web site (HTML) is an example of a page-based catalog. As long as at least some of the information necessary for placing an order is provided, IntelleCat can make use of either record-based or page-based formats.

IntelleCat initially supports two instances of each of these formats: Record-Based—IntelleCat initially supports CIF and cXML record-based formats; Page-Based—IntelleCat initially supports HTML and Acrobat page-based formats.

The Content Manager supports three types of catalogs: Static, Dynamic, and External.

Static catalogs are collections of static data, typically in a file provided by a vendor or distributor. Examples of static catalogs are CIF, cXML and Excel spreadsheet files. Static catalogs are updated by the administrator, typically when a new catalog file is delivered from the vendor or supplier.

Loading a static catalog is relatively straightforward, and involves naming the catalog, selecting a file format from the list of supported formats and specifying the path to the file. Editing the contents of the catalog is an optional step before making the catalog available for shopping.

Dynamic catalogs are maintained on external servers by external administrators. Examples of dynamic catalogs are HTML and punch-out web sites. Dynamic catalogs can be changed at any time, as update control lies with the organization managing the data (site).

While the data available on HTML web sites is often incomplete as a catalog, it may be the only electronic data available. At the very least, it is a starting point at which a company can begin to use and build up the vendor's product data for e-procurement.

Punch-out sites typically contain full procurement information for catalog items, but have other characteristics in common with HTML sites. Web sites can be constructed in a variety of different ways. No two sites have the same 'look and feel'. Navigation to catalog items and search mechanisms can vary widely. The result of this is that corporate users have difficulty adapting to all of the different vendor sites they need to shop. IntelleCat addresses this difficulty by indexing the content from all catalog sources and searching it using a consistent and intuitive interface.

The Content Manager provides special functions for working with dynamic catalogs, in order to support their unpredictable behavior. These functions include:

An automated 'crawling' mechanism for accessing web site product information. In the simplest case, the administrator will enter a 'base' URL under which the vendor's products appear on their web site, and then 'crawl' (automatically and recursively browse and retrieve) that URL to retrieve product pages. Unfortunately, different web sites have a variety of different structures and technical implementations, with the result that automated crawling will not always be successful in retrieving the desired information. In such cases, the target web data are retrieved in a more manual and interactive process. The administrator will manually browse the site and select individual pages to capture, and/or identifying a number of URLs to crawl. Typically these crawls are 'small' and 'shallow', retrieving only a small number of pages.

Local storage of dynamic catalog information. Local caching provides improved response time, and also prevents vendors from gathering marketing information from corporate browsers. Note that local caching is an independent option from indexing of dynamic catalog information. It is possible for the Content Manager to merely index the catalog data available at a site without caching the site's data locally. In this scenario, clicking on a search result link from such a site will take the user to the actual site. This ensures that the very latest data from the site is always viewed.

Automatic, periodic validation of dynamic content. For example, the Catalog Manager can periodically examine vendor web sites to detect updated catalog content. When change is detected, the cached information is synchronized with the new web content.

External catalogs are catalogs in an external database. Typically this is the database of the e-procurement system with which IntelleCat is integrated. External catalogs can also be changed at any time, as update control lies with the administrator of the external system. In the ideal integrated environment, the external system will notify IntelleCat when updates to its catalogs occur, the type(s) of updates (add, delete or modify) and the specific records that were modified. However, as there is no control over such functionality in external systems, IntelleCat also supports a polling function to periodically check for new content in such systems.

The CM is designed to read virtually any type of record or page-based catalog. The present invention has defined an API (plug-in) to the CM whereby the record or page format being used can be defined arbitrarily, and a plug-in understanding that format can be implemented. Then the Content Manager can read that source without having to convert it to CIF format. Record-based formats can either be from a flat file (such as Excel), or from rows in a relational database. Implementing a Content Manager plug-in for a specific data format is a relatively minor effort (a few days of programming time), and no conversion of existing files would be necessary.

IntelleCat is responsible for searching catalogs and related data. It operates from the current search term as shown in the Catalog Index screen. It searches for both general products from the catalog and previously purchased products.

IntelleCat uses a search engine similar to those used for the Internet, except that it is optimized for the environment of electronic catalogs. Within IntelleCat, IntelleCat does not need to be concerned with 'spoofing' or other search result ordering tricks that are common on the internet.

Figure 4:
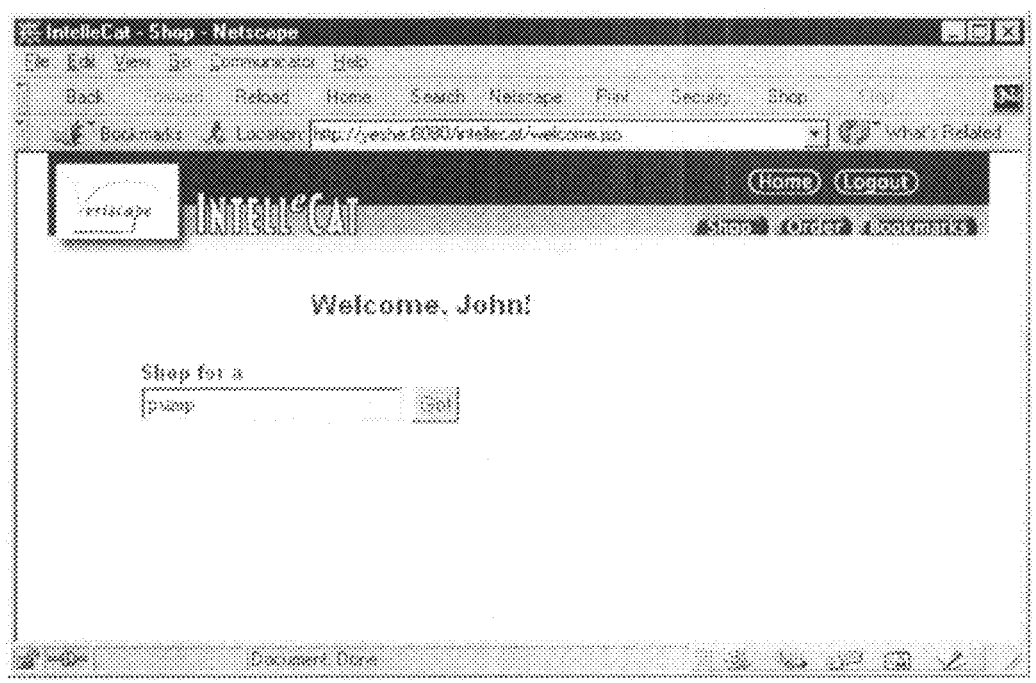
FIG. 4 shows the initial window from which searches are initiated.

The picture in FIG. 4 shows the initial window from which searches are initiated. Note that the first word in a search is referred to as the 'root', as it is the root of the semantic tree. Users are encouraged (but not required) to create search paths that go from most general at the root to most specific as they extend out from the root.

The initial search is typically too general to find specific items, so the search must be refined (extended). The user can select from a list of previously stored 'secondary' terms or they may enter their own terms. In this way, the user builds or navigates branches of the tree. The terms associated with each branch are used to create a catalog search screen. The more branches there are, the more terms there are in the search string, corresponding to a more specific search. A sufficiently specific search returns just a few relevant items from all of the catalog items contained in the system. As the user navigates down the branches of a tree, the system displays information indicating how specific the search is at the current branch. This information includes the total number of catalog items matching the current path, the number of products previously purchased at the current branch, and the number of products previously purchased that contain the current path (and some additional terms).

Figure 5:
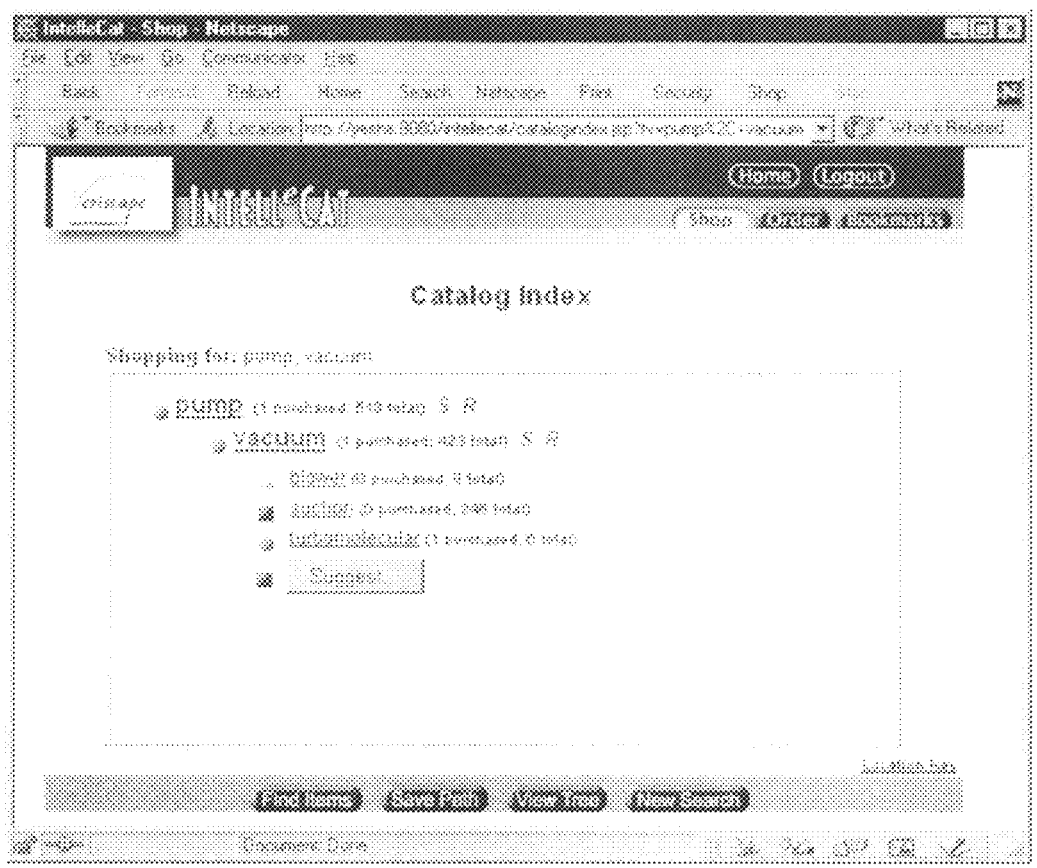
FIG. 5 shows a typical example of a Catalog Index screen.

This is done in the Catalog Index screen, as shown in FIG. 5.

In the above example, the currently active search string is "pump, vacuum". The user can extend the search by either navigating to a child branch of "vacuum", or use the Assist function by pressing the "Suggest" button. In the screen above there are three children below "vacuum": "blower", "suction" and "turbomolecular".

Figure 6:
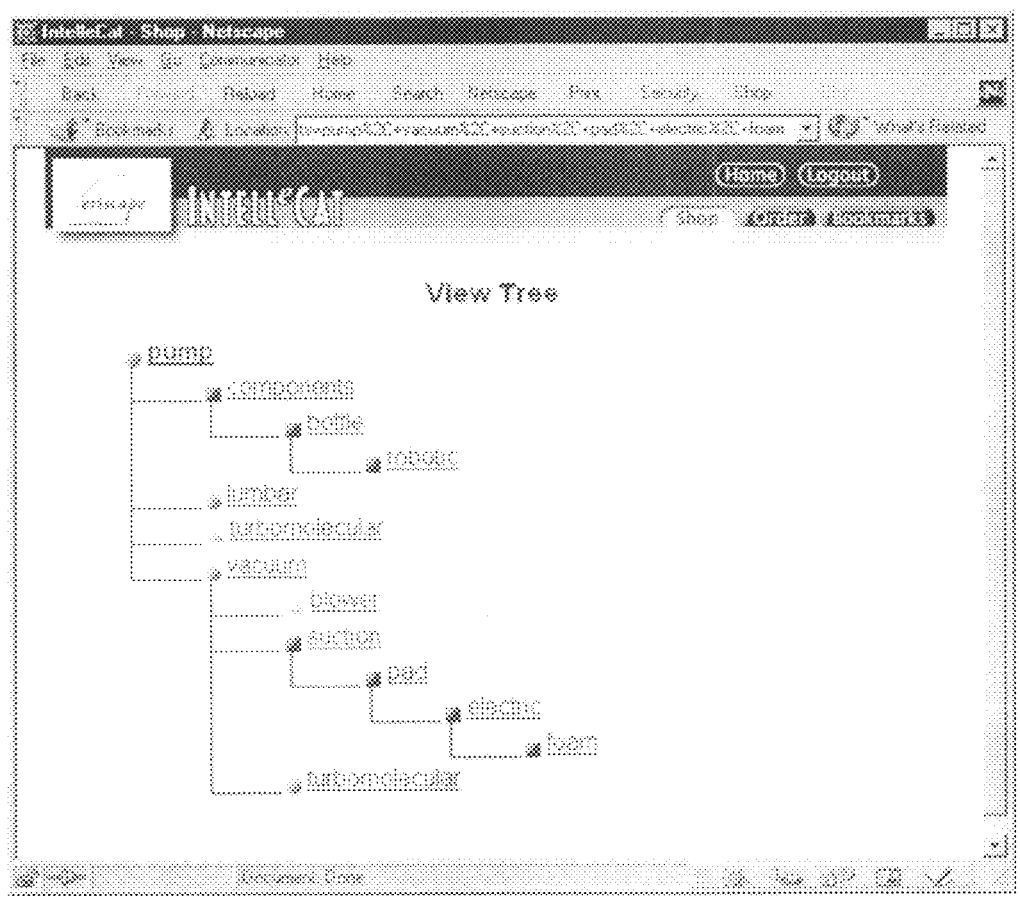
FIG. 6 shows a typical example of a View Tree screen.

The user may also navigate the tree via the "View Tree" screen by selecting the "View Tree" button in the Catalog Index screen. This screen displays the entire tree at one time, as opposed to focusing only on the active search string. An example View Tree screen is shown in FIG. 6.

In the View Tree screen, the user can navigate to any point simply by clicking on a term. That will change the active search string such that the selected term is the bottom-most term in the search string. For example, if the user selected "pad" in the example above, the active search string would then become "pump, vacuum, suction, pad".

The 'Assist' function aides the user in adding terms to their term vector in order to restrict a catalog search to fewer items. This function is typically used when a term vector produces too many search results, too few search results, or not useful results. Assist works by using the current search path words (one or more words or phrases) to search the catalogs for relevant words. Relevance is determined by a number of factors, including proximity to the current search path words and number of total occurrences.

Figure 7:
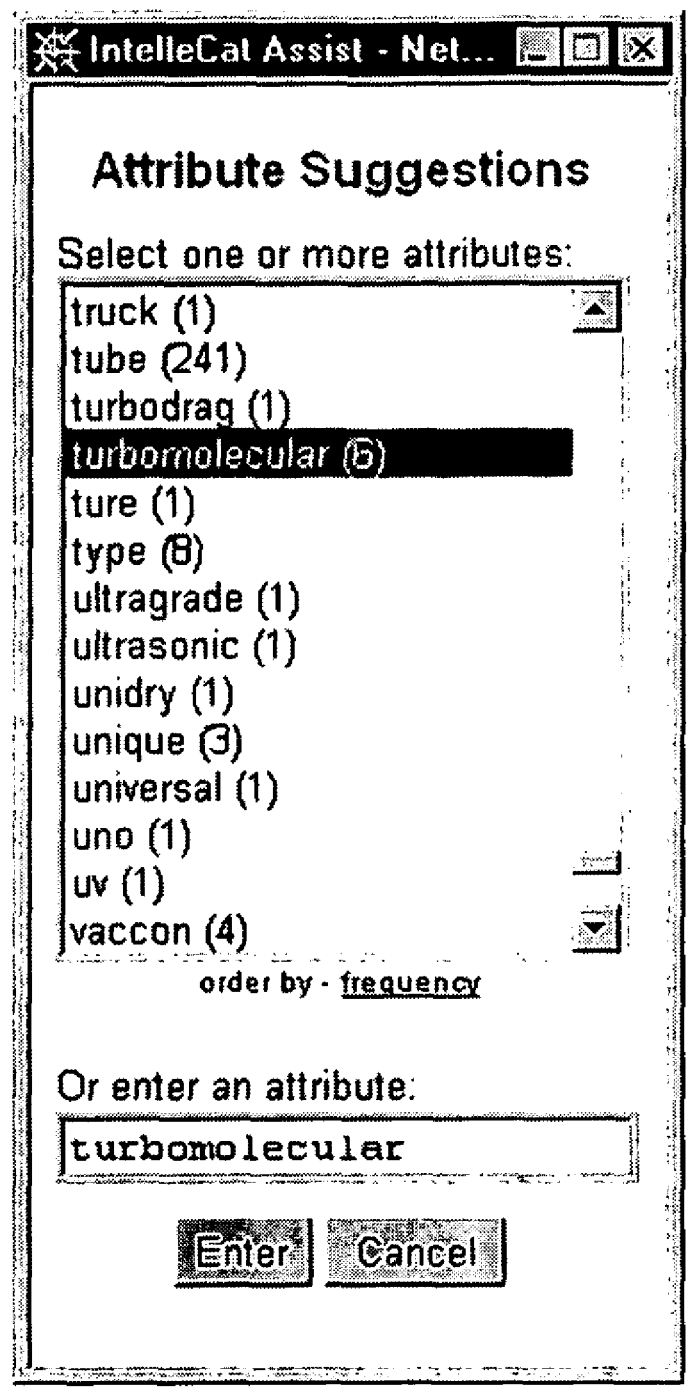
FIG. 7 shows a typical example screen of an Assist function dialog box.

FIG. 7 demonstrates the Assist function dialog box.

Figure 8:
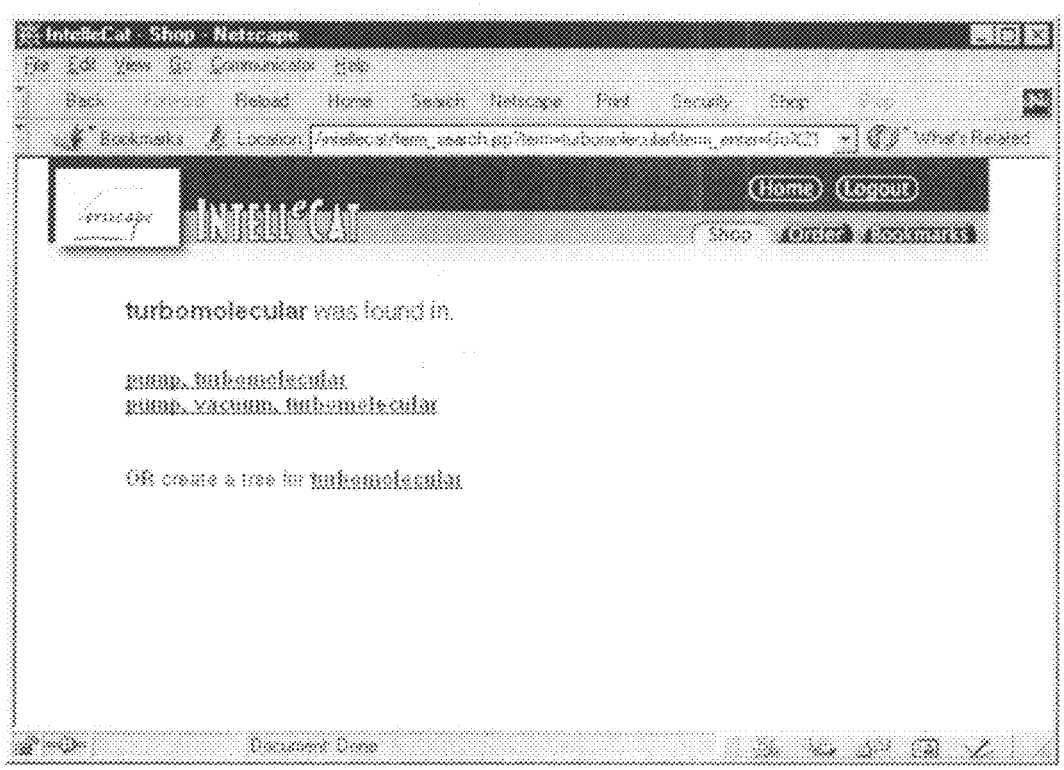
FIG. 8 shows a typical example of an Assist screen that shows items already in the existing master tree space that match a term entered by the user.

Term Search refers to the IntelleCat capability to find search words or phrases within an existing search path. For example, suppose a user starts a search path with the word 'Turbomolecular' in an effort to find a turbomolecular vacuum pump. If there is already such a term in the tree space underneath the root 'pump', the user will see display shown in FIG. 8.

Figure 9:
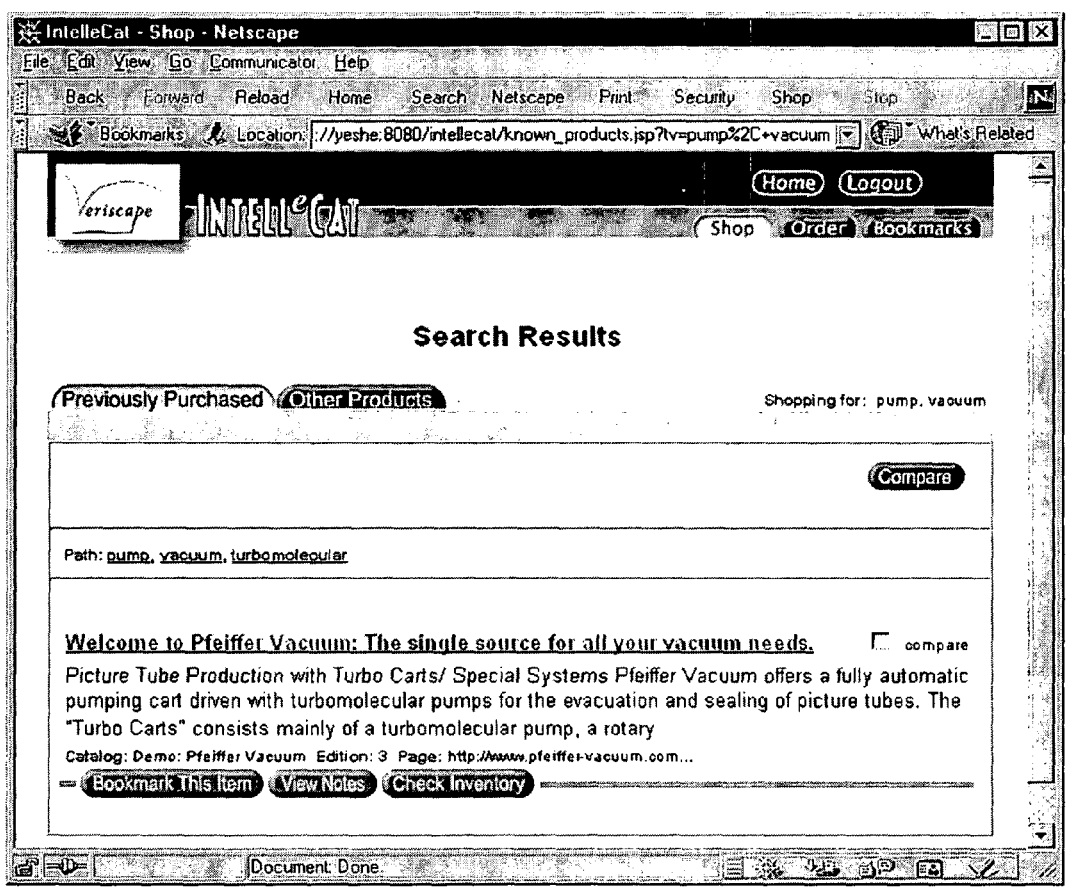
FIG. 9 shows a typical example of a Search Results screen, which appears when the user selects the "Find Items" button at any time in the Catalog Index screen (FIG. 5).

FIG. 9 shows the search results. This screen appears when the user selects the "Find Items" button at any time in the Catalog Index screen.

Note that by default, the search results shows any previously purchased items associated with the search string (which in this example is "pump, vacuum"). If there are no previously purchased items, the search result automatically shows 'Other Products', or catalog products that have not been purchased from the current search term. If there are previously purchased items for the search string, the user can view the Other Products by simply selecting that tab in the window.

Figure 10:
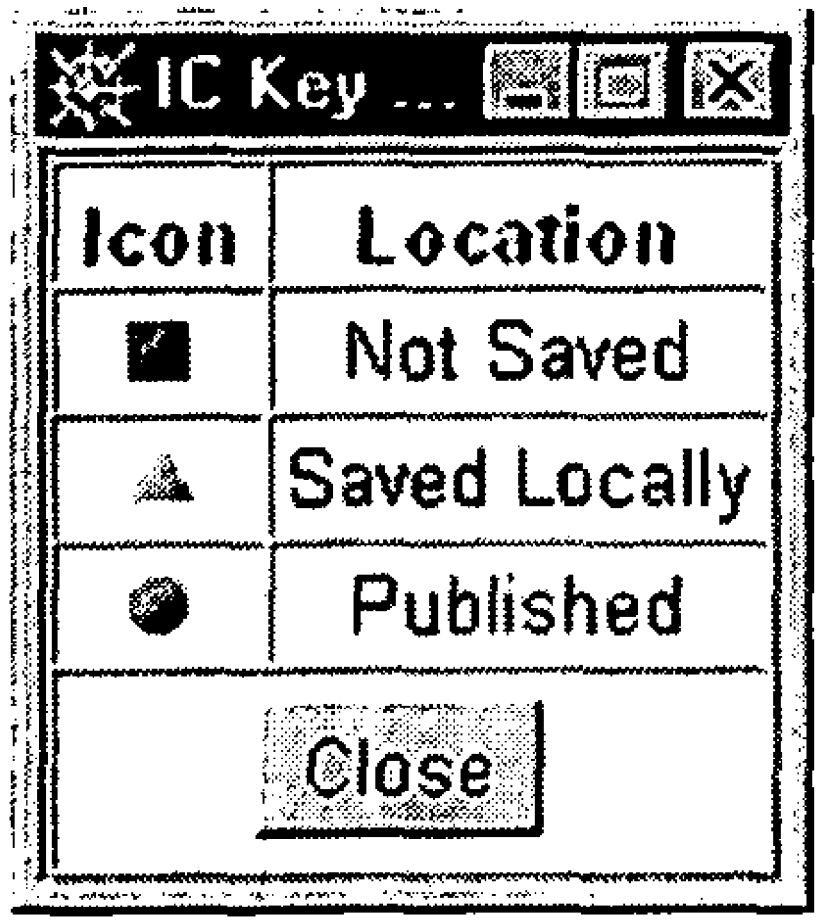
FIG. 10 is a screen that shows the different icons visible in the Catalog Index (FIG. 5) and View Tree (FIG. 6) screens.

The user can explicitly save search or find paths, either locally or globally. This is done by selecting the "Save Path" button in the Catalog Index screen. FIG. 10 explains the different icons visible in the Catalog Index and View Tree screens.

Note that when a user purchases an item, this implicitly indicates that the search path was useful, so it is automatically saved to the global tree space.

Transient nodes exist only while the user's session is active. Transient nodes automatically record the terms that have been used during searching. This helps the user repeatedly try paths that prove not to be useful. All transient nodes are automatically deleted when the user logs out, or the system automatically logs them out due to inactivity.

The IntelleCat component is responsible for remembering users' previous successful search patterns and all related functionality. IntelleCat stores the different branches of a semantic tree in a tree-based structure called the Master Tree Space. This structure allows the users to organically build up relationships between related items over time IntelleCat is the IntelleCat sub-function that can empirically recognize synonyms by detecting duplicated branch groups in a tree. These synonyms are then stored in a Master Dictionary. For example, IntelleCat establishes 'roughing' and 'backing' as synonyms from the paths "pump-vacuum-roughing" and "pump-vacuum-backing" if they both contain the same leaf node(s). This synonym is stored using the oldest term as the primary term and the newer term as the synonym, and the redundant branch(es) are removed from the tree.

The Master Dictionary is a central list of all words and terms used in the semantic trees. It is stored in a central list for several reasons:

- It supports searching for previous occurrences of search terms. This encourages users to utilize previously established search trees, which improves knowledge transfer and re-use.
- It supports a centralized mechanism for validating the spelling of new terms before they are added. The spell-checker has the ability to suggest 'close' matches to existing words, so as to reduce the possibility that users will add misspelled words.
- Synonym data is also be stored in the Master Dictionary, again for centralized access.

The Master Dictionary also supports multiple languages, tracking whether synonyms in one language are or are not meaningful when translated into another language. Synonyms in different languages are made available whenever possible so that the maximum number of users can utilize usage information stored in the master tree space.

The Master Tree Space is the collection of all semantic tree information shared among IntelleCat users. It is responsible for the actual data storage of the tree space and associated products (leaf nodes), and for the concurrency, integrity, recoverability, and logging of all activities within the Master Tree Space. In terms of data storage, the Master Tree Space includes the Master Dictionary. Other aspects of the IntelleCat system are responsible for populating the tree space, allowing it to evolve as the system learns more about the users' search patterns and the product space, and allowing the user to navigate through the different branches and re-use successful search patterns. Background processes manage the ongoing integrity of the tree space and search for ways to simplify the structure of the tree space in order to make products more easily accessible to the end user, by either compressing or expanding the tree in order to better present the products found within it.

The Enterprise Edition of IntelleCat supports resolution of distributed update conflicts, distributed configuration, and replication issues.

All of these functions have administrative interfaces. The Master Tree Space has an administrative function to allow properly authorized users to add, move, remove, or otherwise modify branches and leaf nodes. The background processes have certain functional configuration parameters, as well as operational configuration parameters. All are configurable from a point of view of distribution and both supply means of remotely monitoring the performance and health of the system.

The cross-reference dictionary contains information relating part numbers at the different company sites to vendor part numbers. This information is captured during the purchasing process, either by the end-user or by the purchasing agent—the exact mechanism is not yet clear. Relationships between data in the cross-reference dictionary are very useful to the company. Multiple parts numbers referring to the same vendor part reveals common purchasing between sites (useful to corporate purchasing for negotiating pricing). Multiple vendor part numbers referring to the same part number indicates equivalent parts, and suggests synonyms if the vendors refer to their parts differently. Intelligent reporting capabilities on the cross-reference dictionary data are required.

Corporate purchasing can use the cross-reference dictionary to help determine purchasing patterns across all divisions. For example, corporate would like to see all purchases of a certain product, regardless of location. If different sites have different purchasing systems, this would not be possible.

By cross-referencing the different local part numbers to common vendor part numbers, such patterns can be detected.

Note that the cross-reference information is not reliable, given that users may bypass IntelleCat in a variety of ways (e.g., voice orders and manual orders).

This provides an interface into our part number cross-reference table, enabling customers to extract information about the relationship(s) between external vendor part numbers and internal part numbers.

There are three main types of operations, and thus three types of users: Shopper, Expert and Administrator.

Everyone designated to use the system is considered a Shopper. A Shopper navigates product trees, locates items to buy and can submit purchase requisitions. A Shopper can save product trees (or parts of trees) in their 'personal user tree space' or publish these trees to the master tree space. A Shopper can also utilize bookmarks to save their favorite product links.

An Expert user has all the capabilities that a Shopper has. The Expert can also access a search screen designed to allow multiple terms to be typed in at the same time. This enables the Expert to create trees more rapidly and easily. It is expected that Experts will establish some of the initial trees to be used by subsequent shoppers. Finally, an Expert can configure 'preferred' items in the catalog, and can remove trees created by that expert, providing they have not yet been used to purchase any items.

An Administrator has all the capabilities of an Expert user. Additionally, an Administrator is able to configure the IntelleCat system for site and global use. An Administrator can delete product leaves and/or branches, generate statistics on general use of the IntelleCat system, specify and import/export vendor catalogs into IntelleCat, and administer users and vendors. As users browse catalogs and find items, IntelleCat tracks the location and description of the items. If an item is purchased, the location and description are automatically recorded and shared with other users. This 'learning' function is intrinsic to IntelleCat, and is possibly the most critically important concept in the product. Additionally, users can manually save a path even if it was used to purchase an item. This allows users to record useful paths either for their own use of for use by others, without having to actually make a purchase.

The Expert function allows an Expert to enter multiple descriptive terms in a single operation, as opposed to a single term at a time. This is the most efficient mechanism to create new product trees for procurement specialists who are very familiar with IntelleCat and knowledgeable about how to describe products.

When a user navigates a tree all the way to a leaf node, and the leaf node is a cached page from a web site, the page may contain additional URLs that the user can browse. In the most general case, these links could potentially lead anywhere on the worldwide web, and the user may browse any number of connecting links. By browsing a number of such links, the user may wind up on a page that has little to do with the current term vector. In such cases, the UI will request assistance from the user in determining the appropriate terms to be associated with the destination page at purchase time.

Comparison shopping allows the user to check a number of search results, clicking on 'compare' and seeing the items compared in number of individual windows. Intellecat is able to sort by price, sort by vendor and sort by popularity (most frequently purchased). Null data is sorted to the bottom of the list—although this is a configurable.

In some cases, different parts from different manufacturers are equivalent (fungible), but in other cases, different parts (particularly catalysts) are not found to be equivalent. This information is only discovered through trial and error, but could come to represent a significant knowledge base among a company's employees. In order to be able to record this information, IntelleCat supports Product Annotation, which is the ability to enter text about a particular item.

The basket order feature allows the user to order groups of items that are usually or frequently ordered together. For example, a given pump would typically require an accompanying mounting bracket in order to be useful. So the basket order would consist of the pump, the mounting bracket and other associated mounting hardware.

IntelleCat is able to 'mark' certain items and indicate that they are part of a sub-assembly, and assign a name to the sub-assembly. Note that this is sometimes referred to as 'related items.'

There are also several system-level features of IntelleCat.

The Query Mechanism provides an API into the semantic tree data space. This feature is implemented directly via the underlying NVSI technology, which supports and XML query interface.

In order to serve a globally distributed corporation, IntelleCat maintain synchronized instances of the master tree space (Distributed and Replicated Dictionaries) that are geographically distributed over multiple countries, timezones and languages.

Every interaction with the data server creates an entry in the Transaction Log. This log is useful for debugging and run-time monitoring. The transaction log may also be used as the primary replication mechanism when multiple data servers at different geographical sites are supported.

The User Profile consists of the following items:
  A small table containing essential information on the user, such as name, user name, user id, location, primary language and role.
  An interface for the administrator to maintain the user profile data
  An API to external systems that may contain user profile information. This provides an automated mechanism to keep user data synchronized with other client systems
  Shopping history and bookmarks. User bookmarks are considered to be a component of the user profile.

The user is able to publish bookmarks. The default action is not to publish a bookmark. Note that because incomplete searches can be saved locally or merged into the master list, there is some under-the-covers functionality that must take place when locally saved incomplete searches are book marked and then published. These will implicitly check-in the local, incomplete search.

Vendor Profile includes vendor name, address, and primary contact, how long they've been a supplier, and standard discount or discounts. Also included is the annual quantity bought from each vendor, but only in so far as such data is maintained within IntelleCat. Purchasing personnel are the primary users of vendor profile data.

A list of all parts the user has ordered in the past (User Ordering History). This can be easily searched by at least one keyword, such as they keyword used to initiate a find tree (e.g., pump).

For example, if Bob in maintenance goes to order a pump, IntelleCat looks into his user history table even before it looks through the Master Tree List for pump. Corresponding to this (obviously) is a mechanism to view and find items previously purchased.

IntelleCat supports a link to In-house Inventory Systems. This link is used to indicate to the user whether or not a desired item is actually in inventory, either at the local site or some other site.

Note the due to the fact that the IntelleCat system can easily be bypassed in the purchasing process, and the fact that there is a dependency on an interfaces into the local inventory system, IntelleCat cannot provide rigorous inventory information. However, indicative inventory system may prove extremely useful.

Certain IntelleCat functions are reserved for the administrator, such as setting installation-specific or global configuration values, and manual modifications of trees in the forest.

One of the important functions that can be performed by an expert user is the explicit creation of search trees (Tree Creation). This is typically be done when a system is newly installed at a site, or the company begins buying a new type of item. The user is be able to create a new root node as well as all subsequent branch nodes. The reason for doing this is to establish the semantic hierarchy for the trees in question.

The administrator is able to remove any item in the system (Deleting Trees and/or Branches) including:

Master tree space sub-trees, up to an including an entire tree.

Master dictionary entries.

Local user sub-trees, up to an inclUding an entire tree.

The administrator is able to manage users profiles, vendor profiles and is able to manage, import and export vendor catalogs.

Management of user profiles varies depending on whether or not IntelleCat user information is administered in a stand-alone configuration or in conjunction with another system. It is generally more useful to share information with other systems, which is typically done via an ERP (Enterprise Resource Planning) System interface.

Vendor profiles are required so that when an item from a catalog is ordered, there is sufficient information passed with the requisition to identify the target vendor.

The administrator can back up system data or restore if from a previously backed-up data set. Data included in the backup/restore process consists of the semantic trees, catalog data, requisition history, user profiles and bookmarks IntelleCat contains built-in features to support automatic load balancing or fault tolerance.

Scalability is a critical aspect of the system, second only to raw performance under ideal situations. Fortunately, the nature of the system lends itself well to scalability.

IntelleCat supports multiple languages. The UI supports Unicode, and the spell-checker, synonym functions and master dictionary support multiple languages. The Content Manager supports foreign languages, and the search engine stemming algorithm supports the grammatical rules of those languages.

IntelleCat contains a number of applications of NVSI (Net-centric Virtual Supercomputing Architecture) concepts to a specific business application. This chapter reviews these concepts, describing how the generic NVSI concept is extended and modified to the needs of the IntelleCat application.

NVSI supports flexible degrees of data dimensionality. In the real world, data often does not fit cleanly into a relational paradigm. The deficiencies of the relational approach are most easily recognized when compared to the approach taken by NVSI.

Relational database concepts are an important part of modern software systems. However, they are not suitable for all data processing environments. There are some problems inherent in the 'relational' approach. Specifically, relational database designs require the data modeler to define a specific structure into which the 'important' data from a system will be placed. The rest of the relational system will then be able to efficiently manage and process these data structures.

If the core data cannot be constrained to specific, constant data structures, the relational approach breaks down. Compromises must be made, and the results of these compromises are detrimental to the functionality of the system. One business application that clearly differentiates between the flexibility of NVSI as compared to the relational paradigm is electronic catalog data. The relational approach assumes that there is a 'correct' structure for catalog data, and that catalog data should be put into this structure before it can be processed by an e-procurement system.

NVSI recognizes that there is a core set of data required for e-procurement, plus many other data elements that may be relevant to the core data. Furthermore, only certain subsets of the core data are required for processing certain steps of e-procurement workflow. It is inefficient to require that data be present for all workflow steps before allowing any workflow steps to occur. Rather, if the data required for a specific workflow step exists, then the function should be enabled. This is a core concept of NVSI that is implemented in IntelleCat. For example, shopping can be performed in IntelleCat as long as some descriptive information about an item exists. It may lack certain data required to complete the purchase of the item, but the consumer can initiate the order, and the remaining purchasing data (such as price or other accounting information) can be added later. Additional product data can also be dynamically added and related back to existing data. The structure of this data can be also be dynamically defined.

At a low level, these data relationships can be shown by the following data descriptions (TABLE 3):

TABLE 3

| Data Set ID | Data key fields | Data attribute fields |
| --- | --- | --- |
| 1 | <key fields #1> | <data attributes #1-A> |
| 1 | <key fields #1> | <data attributes #1-B> |
| 1 | <key fields #1> | <data attributes #1-C> |
| 2 | <key fields #2> | <data attributes #2-A> |
| 2 | <key fields #2> | <data attributes #2-B> |
| 3 | <key fields #3> | <data attributes #3-A> |

This example shows three sets of data, where the dimensionality of each data set is different. A single data set consists of all the data elements having the same key field. This differs from the relational approach in that the structure of the data attributes can be dynamically defined.

Figure 11:
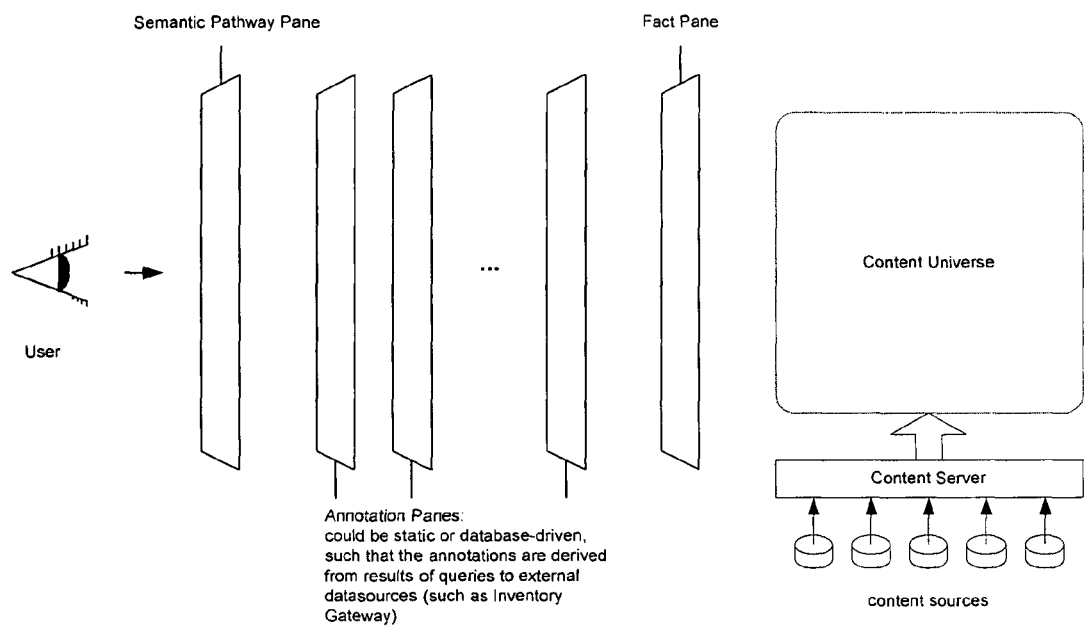
FIG. 11 illustrates how the user's perspective is created by viewing the data source through a number of overlaying "data panes".

FIG. 11 illustrates the same concept at a more abstract level. At the far right of the figure is the source of the 'raw' data. A number of content sources contribute to this pool of information. The user's perspective is created by viewing the data source through a number of overlaying "data panes".

The first pane is the 'Fact' pane. In NVSI this is implemented as a point-cloud manifold. A data point (or 'fact') at this level indicates that a specific item in the content universe is of interest, and a description of this item is established and remembered. This description is the data key described above. An analogy for understanding the fact pane is the 'flyswatter'. Consider the content universe as a number of flies buzzing around. It is not feasible to record anything about a specific fly, as they are too dynamic. But if one fly is pinned to the Fact pane, it can then be easily referenced. Data about this fly could include the specific coordinates on the fact pane of the fly, when it was pinned to the wall, its size, etc.

A number of 'annotation' planes may then be overlaid on the fact plane. These planes contain additional information about the data in the fact plane, such as corrections to the original data, notes, useful text descriptions and so on.

In IntelleCat, the fact plane data is an item in a catalog. The annotation planes include product notes, part number cross-references, item corrections (some data may be incorrect in the original item referenced in the fact plane), accounting information and other data. Another type of annotation plane is a gateway to external data, such as the inventory gateway. This type of plane contains functionality instead of data, where the functionality is 'how to look in an external system for data related to this item.

The third type of pane is the Semantic Pathway pane. It records relationships between combinations of semantic tokens and facts from the Fact Pane. This is of course where the IntelleCat trees go.

Collectively, this concept is a generic machine designed for interactive knowledge capture and utilization. Users are given NVSI-based tools with which to explore items in the content universe. One tool is a search mechanism that automatically captures and shares knowledge about the content items. Another tool assists the user in finding out what meta-data is already known about the item. The interactive 'search-assist' is a powerful combination. Other tools allow the user to explicitly add information about the item, or to see and access external systems that may have additional item information.

IntelleCat uses two types of NVSI manifolds: The 'tree' and the 'point-cloud'. The tree manifold is the most visible aspect of NVSI, as the primary screens used in the user interface display semantic tree data.

The technical architecture design for IntelleCat is based on an industry standard [e.g., two-tier, three-tier, distributed, server-centric, peer-to-peer, etc.] system model.

IntelleCat has a three-tier architecture, consisting of a set of back-end server processes, an application server for application and presentation logic, and a front end acting as the GUI presentation layer as shown in FIG. 1.

The application server for the stand-alone version of IntelleCat is an implementation of Java Server Pages. Either the Tomcat server or IBM's WebSphere server may be used, although IntelleCat uses Tomcat as the default. As Tomcat is a Java-based server, the Application server may run on any platform running the Java virtual machine. It is currently running Java 1.3.1.

The application server for integrated versions of IntelleCat can be either the same as the stand-alone architecture (wherever possible), or adapted to the application environment of the other system.

JSPs provide a light layer of presentation logic; most of the application logic is found in a series of Java Beans which provide the functionality for tree navigation, searching, ordering, as well as other interactions with the various back-end services.

Interactions between the JSP Application server and the various backend services occur through a set of well-defined interfaces. The implementation behind these interfaces may result in either a local function call, if the service is defined to be in-process, or in some form of inter-process communication, if the service is not running inside the JSP Application server. Note that due to the rigid enforcement of the separation of interface from implementation, services which are currently in-process may be moved out of process as requirements dictate. Scalability and performance are the typical driving forces behind such issues. As needs for higher performance are identified, various components can be moved to the proprietary NVSI communication protocols. Currently, however, all inter-process communications are done over open standards.

The backend services are broken into several sub-systems: the NVSI Tree storage, JODA, Catalog Management, User Management, Searching, and Purchasing. As mentioned above, Catalog Management, User Management, and Procurement subsystems are all in-process with the application servers, while the NVSI Tree storage and JODA systems run in their own processes.

Functionally, IntelleCat presents several distinct subsystems to the user. These include the Search Engine, IntelleCat, IntelleCat, Catalog Management, Administration, Purchasing and Miscellaneous Functions.

The Miscellaneous Functions module includes the smaller components of IntelleCat related to eProcurement. These functions include Inventory, Basket Orders, Purchasing History and Product Annotation.

Figure 12:
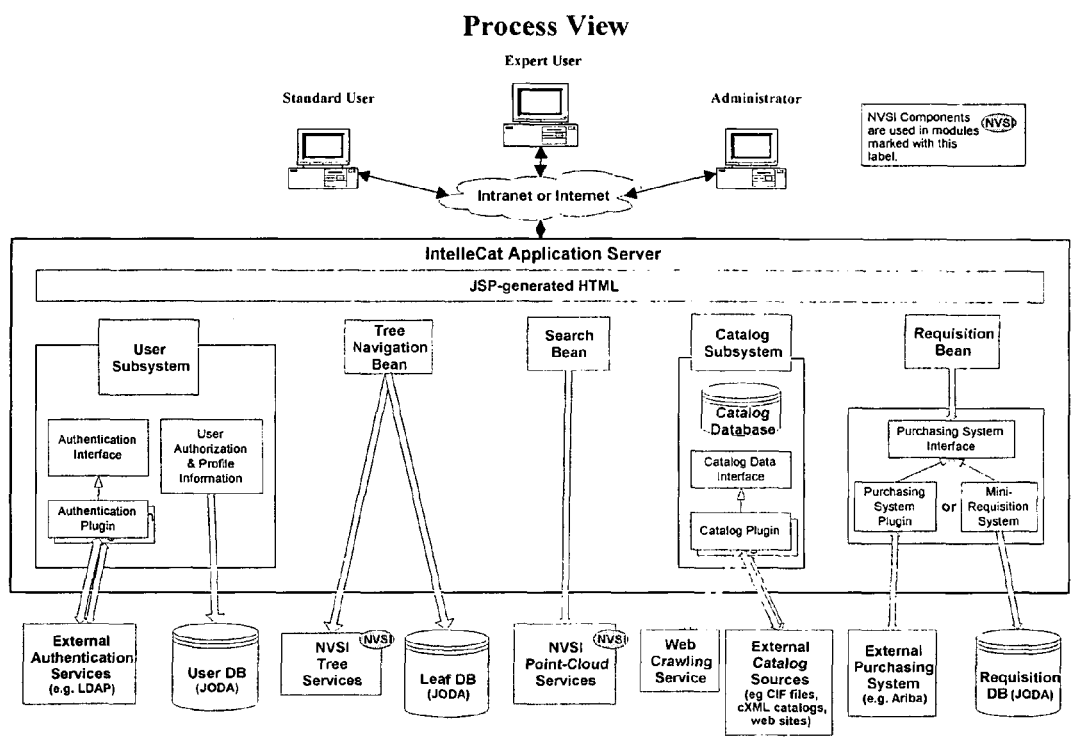
FIG. 12 is a schematic block diagram that shows a process view of the functional components of the invention.

The Catalog Management, User Management, and Procurement components are all implemented in-process in the initial versions of IntelleCat., as shown in FIG. 12. All function calls in these modules are therefore resolved locally.

The NVSI Tree Server, JODA (the Java Object Database) and Web Crawling are all out-of-process IntelleCat components, and the application server interfaces with these components via TCP/IP. External User Authentication, External Catalog Sources and the External Purchasing Interface are external to IntelleCat, and thus are obviously in separate processes.

Where feasible, open standards, or subsets thereof, are used in defining component interfaces. For example, the Java Object Database supports a subset of OQL and the OMDG Java binding. The NVSI tree structure, however, is unique to NVSI, and the structures are therefore sent using NVSI-specific XML schemas.

Catalog Management, User Management, and Procurement subsystems are all in-process with the application servers, while the NVSI Tree storage and JODA systems run in their own processes.

The user interface layer is provided as a series of HTML and Javascript pages in either a Netscape or Internet Explorer browser, versions 4.x or later. The HTML is served as a series of JSP pages, and state is maintained automatically through the usual JSP mechanism of using either cookies (preferred) or URL mangling.

NVSI Tree Storage stores the knowledge of successful search strings and found products in a tree-based structure for later retrieval and navigation by the users.

The Java Object Database provides object persistence for other components in the system; e.g., stores user data and profiles, information about found products, etc.

The Catalog Subsystem provides online access to various forms of electronic catalogs. The Searching subsystem allows users to search the online catalogs for products.

The Purchasing Subsystem allows users to submit orders to procurement, and helps capture the knowledge of successful finds.

The User Subsystem allows an administrator to add, delete, and otherwise administer users of the system.

When catalogs are administered (added, updated, removed or any other changes) in an external procurement system, changes must be propagated to the IntelleCat Content Manager. The Catalog Interface provides mechanisms for such updates.

IntelleCat generates requisitions that are processed in other systems. This interface supports requisition-related functions such as creating a requisition, adding items to a requisition, deleting items from a requisition, viewing contents of a requisition and updating the status of a requisition.

External inventory systems may be accessed by for a single item. This interface passes item details to an external system and returns inventory information to IntelleCat for display.

IntelleCat builds up cross-reference information Part Number Cross Reference Database) from relationships established between catalog part numbers and the Engelhard part numbers referenced when ordering. This information is available via an API or through preset reports.

Many systems contain redundant information on user IDs and user authorization levels. In order not to duplicate this information yet again, IntelleCat uses a similar approach as Ariba, in that IntelleCat support s the ability to import user information from external ERP systems. For stand-alone environments, IntelleCat also has the ability to define user & authorization information, partitions and variants locally (User & Authorization Information).

The 'forest of trees' information that is built up in IntelleCat over time may be of interest to system administrators and/or management, typically for reporting purposes. This information on the structure, values, origination, frequency of use and other information about the created trees is available via an API (Index Information Querying).

When IntelleCat is installed, loading of initial data must take place prior to operation. Required initialization data includes user information, external catalogs, internal catalogs and vendor information.

The search engine module is a core component of the IntelleCat product. It allows users to navigate quickly through all on-line catalogs, find the desired items, and initiate purchase requests.

Figure 13:
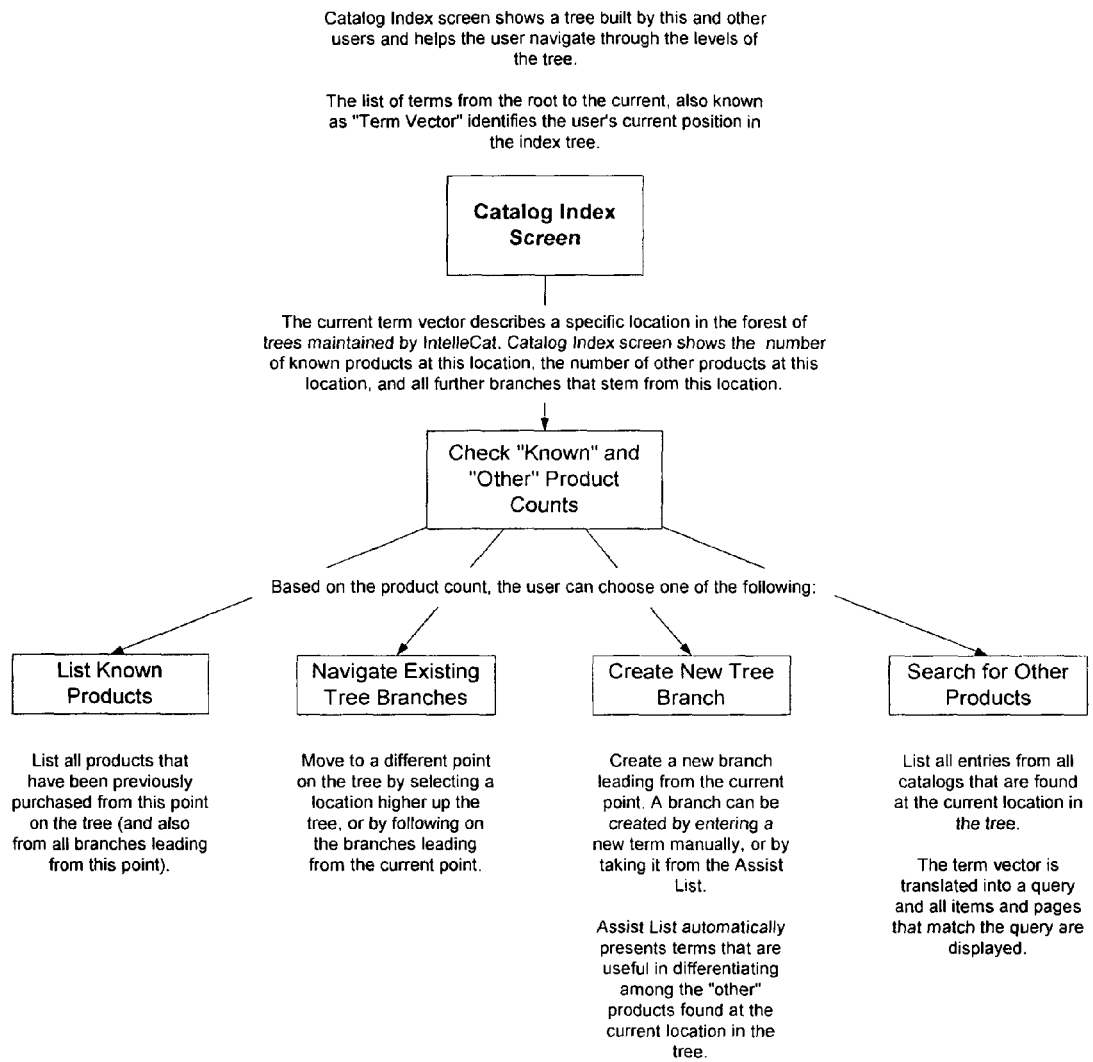
FIG. 13 describes the various functions supported by the Search, Assist and Navigation subsystem.

The Search, Assist and Navigation subsystem provides the user with an interface into IntelleCat's catalog repository and the repository of captured knowledge. FIG. 13 describes the various functions supported by the subsystem.

In the general case, the search engine interfaces to a content manager that provides the information required for the indexing, searching and Assist functions. For IntelleCat, the content manager is the Catalog Manager. Other applications utilizing the search engine module use a different content manager instance.

Web search technology has matured over the last few years to be a familiar and powerful method for searching rich content. Partial hits, stemming, relevance scoring, and cross-field search make it very suitable for searching among product descriptions. All of the different formats in which data sources can exist need are normalized and presented to the indexing engine in the same way. Data sets can be added and removed from the common index.

There are two types of data sources supported by IntelleCat: Static and Dynamic. Static sources are simply collections of static data, such as read-only files. Dynamic sources are any data source that can be change at any time, such as read/write files, web sites, etc.

The Content Manager exposes a number of services to data source plug-ins that allows the plug-ins to acquire, index, and store content in a structured and efficient manner. These services include the Storage service, Index/Search service, and a Web Crawling service.

While the data from static sources is always available and access to it is fast, availability and performance of static sources can vary. Because of these differences, the search engine provides special modules for working with Dynamic Catalogs. These modules are Content Discovery and Content Cache.

Content Discovery is an automated process that periodically (on a schedule) queries designated dynamic sources to detect new or updated content. If any new or updated content is discovered, it is scheduled for indexing.

The Content Cache is a repository that optionally retains a copy of all discovered content from a dynamic source. When enabled, the cache is populated during indexing and the Content Server uses the data from this cache rather than the live data from the dynamic source.

The Content Analyzer is a module that takes an item from content and parses it into fields required for indexing and further processing. Content definition includes the information required for parsing items from this data source.

The Content Indexer visits data sources scheduled for indexing, retrieves the content, passes it through the Content Analyzer, and adds it to the data source's index. If Content Cache is enabled, the retrieved and analyzed content is stored in the cache as well.

The Content Server accepts requests for individual data items, locates the items, renders them into a format specified in the request, and returns the rendered content to the requester. If the requested item is available in the Content Cache, that copy is used. Otherwise, the Content Server retrieves the item from the catalog and passes it through the Content Analyzer.

The Search Server accepts and executes queries on the data indexes, returns results of the query to the requester. Result format depends on the query. There are three types of queries: Search, Count, and Assist. Search Queries return a list of data items that match the query criteria. Count Queries return only the number of hits for the entire query and for individual terms of the query. Assist Queries return a list of additional terms that can be added to the query to further subdivide data items into useful subsets.

Products are described using different languages, different language styles, by different vendors, in different catalog formats, and with varying degree of verboseness. Some product descriptions use very terse language, full of abbreviations. Others use very flowery descriptions, designed to make the product more appealing. Still others may use verbose, but purely technical descriptions full of specialized terminology and various specifications. This variation in product description is a fundamental problem in electronic purchasing, making it hard for end users to consistently be able to find desired items.

Assist helps users in determining appropriate additional search terms in order to restrict a catalog search to a reasonable number of appropriate items. This function is used when an existing term vector produces too many search results, or too few, or not useful results, and the user wants assistance in determining additional terms.

By clicking on the 'Assist' button, the user initiates an attribute search using the currently active term vector against the previously generated search index. The search results are processed using a variety of proximity-frequency algorithms in order to produce a list of possible additional terms for the term vector. This information appears in a screen that allows the user to select zero or more Assist-suggested terms. The user is also able to manually type in a term. A user will typically use Assist when the nodes of the existing tree are not appropriate for the user's needs, or the user wants help in determining available search qualifiers.

The number of terms returned by Assist processing can range from zero to very large. The UI is able to handle a very wide range of results.

The definitions in TABLE 4 are relevant to Assist processing.

TABLE 4

| | |
|---|---|
| Term | A component that can be made part of a Term Expression. This is typically a single word, but can also be parametric values. |
| Term Operator | An operator used to combine terms. Valid Term Operators are AND, OR, NOT, =, <, <=, >, >=, !=. |
| Term | Any combination of terms combined using Term Operators. Note that a Term Expression Expression is itself a Term. |
| Term Vector | A group of Term Expressions combined using only AND, OR and NOT operators. |
| Query | A request for information about a set of documents. Typically evaluated against a pre-computed index over this set of documents. |
| Index | A pre-computed data structure, that allows rapid execution of Search, Count and Assist queries. |
| Search Query | A query that selects a subset of documents that satisfies a Term Expression and a number of other constraints specified in the query (such as minimum score, maximum number of hits, etc.). Perhaps a better name for this would be "Select Query". |
| Selected Set | A set of documents produced by a Search Query given a particular Term Expression. Also referred to as Selected Document Set. |
| Drill-Down Term | A term that can be added to a Term Expression (TE1) to produce a new Term Expression (TE2), such that Selected Set of TE2 is a subset of the Selected Set of TE1, provided that other search constraints are identical. |
| Drill-Down Document Set | A drill-down document set of a term T on the term expression TE is a set selected by a new term expression TE2, where TE2 = TE AND T. The original document set selected by TE is called a Parent Document Set in relation to the Drill-Down Set. Expression TE is called a Parent Term Expression, and the expression TE2 is called a New Term Expression. |
| Count Query | A query that returns only the number of documents in the subset what would be returned from the Search Query, given identical Term Expression and the additional constraints. |
| Assist Query | A query that returns a list of Drill-Down Terms based on a Term Expression and a number of other constraints. |

'Drill-down' refers to the iterative, interactive process of constructing a Term Expression. A step in the drill-down cycle consists of presenting the user with a set of Assist terms, the user selecting one or more terms, adding these terms to the current term expression and displaying summary information about the resulting drill-down document set. This summary information includes the number of previously purchased items and other catalog products found using the new term expression.

By implementing this process interactively, the user is able to see intermediate results and iteratively adjust the term vector, eliminating some terms and adding others as necessary in order to achieve the desired search results. A 'perfect' drill-down is the process of constructing a Term Expression that leads the user to 'perfect' search results. The 'effectiveness' of a particular drill-down step can be measured in terms of how closely it comes to this ideal. Effectiveness can more tangibly be defined in terms of completeness and relevance.

A drill-down document subset is 100% complete when it contains all relevant documents from the parent document set. A drill-down document subset is 0% complete when it contains none of the relevant documents from the parent document set. A drill-down document subset is 100% relevant when it contains no irrelevant documents from the parent document set. A drill-down document subset is 0% relevant when it contains all of the irrelevant documents in the parent document set.

This means that a 100% complete set may also contain any number of irrelevant documents. And a 0% relevant set may also contain any number of relevant ones. This is in conflict with general usage of the term "relevance", but for now this is how these measures are defined.

In IntelleCat, users are looking for documents that describe products they want to buy. A perfect IntelleCat term expression is one that selects all and only those documents that describe products the user is interested in. That is, the term expression is 100% complete and 100% relevant. The objective is to create a term expression that creates such a result set from the source document set.

IntelleCat starts out with 100% completeness and 0% relevance. During the drill-own process IntelleCat strives to increase the relevance without reducing completeness. Suppose that a user starts with a 100% complete term expression that used only AND operator, so that the selected set for this term expression would contain all of the relevant documents. If the only operator used is 'AND', every term in this term expression would have to exist in every relevant document. This will not be true in the general case, as we can't assume that any given term will exist in all descriptions of a product. Product descriptions are notoriously inconsistent. Also, for a term expression to be 100% relevant it must contain no documents that are not relevant.

The use of only the AND operator is good for increasing relevance but tends to reduce completeness. Therefore, the Assist algorithm functions to increase relevance while minimizing the degradation of completeness.

There are a number of possibilities in regards to the effect on completeness. Suppose that the set of drill-down terms presented to the user contains only two terms (A and B):

1) Term A has 100% completeness, while Term B has 0%. This means that the first term is found in all relevant documents in the parent set and term B is found in none of them. Note, that this gives us no indication of the effect of these terms on the relevance, since term A can also be found in all of the irrelevant documents in the parent set and term B may not be found in only one of them (presumably, both terms must exist in a least one document in the parent set to appear in the drill-down list).
2) Terms A and B both have 100% completeness. Again, they may have very different relevance effects.
3) Terms A and B both have 0% completeness. This is also quite possible, it just means that both A and B are found strictly in irrelevant documents of the parent set.
4) Terms A and B have some non-zero and non-100% completeness. This case has a number of sub cases, by the effect of both terms on completeness when they are combined using the OR operator into a single term. A OR B will always have completeness equal or greater to the separate completeness of A and B. Beyond that:
a. A OR B has 100% completeness
b. A OR B has completeness greater than max(compl(A), compl(B))
c. A OR B has completeness equal to max(compl(A), compl(B))

The choice between these two is governed by how disjoint is the selection of relevant documents from the parent set by A and B separately.

The Assist algorithms to extract the suggested terms from the search results become very sophisticated over time. In one algorithm of the present invention, terms are suggested by searching the catalog index using the existing term vector, extracting keywords from the found pages and performing some filtering on the results to remove irrelevant words.

The first-pass Assist algorithm is as follows:
1. Execute query against catalog index using current term vector.
2. Filter result documents by a configurable relevance threshold.
3. Extract text (words) from result documents.

4. Process text to remove duplicates and "kill list" entries.
5. Compute the Average Minimum Proximity (AMP) of processed text to term vector words.
6. Exclude AMP greater than a configurable threshold. (Ballpark of 3.0 works well).
7. Present results to user.

Note that the 'kill list' is a set of words that are generally not useful in searches, such as common prepositions.

The presentation of the Assist results to the user can be done in a variety of ways. One approach used in the present invention is a list-box of individual words, from which the user can select one or more words to add to the term vector.

The results can be sorted in a variety of ways, including:
1) Relevance count, descending (default);
2) Relevance count, ascending;
3) Alphabetical, ascending;
4) Alphabetical, descending;

The second-pass Assist algorithm adds the use of the OR operator to term expressions. The OR operator helps with completeness but not with relevance. If there are two relevant but insufficiently complete drill-down terms, the user can combine these two terms into a single term using the OR operator, thereby (potentially) increasing the completeness but leaving the relevance at the level of the least relevant of the two. The degree by which the completeness improves depends on how disjoint were the two drill-down sets. The completeness of the Assist list is improved by automatically expanding the term vector words with any known synonyms. For example, if the Master Dictionary knows that 'roughing' and 'backing' are synonyms, then the user-created term vector "pump AND roughing" will automatically be expanded to "pump AND (roughing OR backing)" during the search query.

The Master Dictionary contains the synonym information. It also contains some information regarding the domain under which the synonym is valid, and the search engine must be able to interpret this domain data. Similar to synonym substitution is acronym and abbreviation expansion and/or substitution in the term vector during searching. The Master Dictionary contains the relevant metadata and information on domain validity.

To determine which synonyms are relevant in the context of a given description, Assist use NLP (Neuro Linguistic Programming) methods. With acronyms, Assist uses domain-specific acronym dictionaries that are keyed by the classification of the entire catalog (into a site-specific catalog set like "Office Products") or by classification of individual items using UNSPSC codes where available.

While the first-pass algorithm processes all words individually, the second-pass algorithm recognizes phrases that occur in the documents. For example, "lite beer" is recognized as a phrase that occurs in the documents, so it will appear in the Assist results as a unit, not the two separate words "lite" and "beer".

The second-pass algorithm also implements parametric search capabilities. These parameters are not used when processing the document set returned by the query, but they are used in the query itself.

Finally, a future version of IntelleCat we will use the capability of NVSI-Omega in utilizing spare CPU cycles to do exhaustive cross-correlations of existing tree tokens, search results and purchased items. The Assist algorithm will be extended to include some weighting of these cross-correlations.

Catalog Manager

The Catalog Manager is the specific Content Manager for the search engine in the IntelleCat product. It is referred to as the Content Manager when emphasizing its generic, content-independent aspects, and as the Catalog Manager when emphasizing its electronic catalog-specific aspects.

The IntelleCat Catalog Manager has an open interface for defining new catalog types. It utilizes a plug-in architecture that enables customers or third-party vendors to make a wide variety of catalogs available for searching by IntelleCat.

IntelleCat views catalogs as containing either items, or pages, or both. Catalogs that explicitly define products with machine-readable fields are referred to as "Record-Based", while those that present information only in human-readable formats are referred to as "Page-Based". A CIF file is an example of a record-based catalog, while a web site is an example of a page-based one. As long as the information necessary for placing an order is provided, IntelleCat can make use of either type.

IntelleCat comes with a plug-in for CIF catalog format (which is a record-based format used by Ariba to manage its own catalogs) and a plug-in for Web catalogs, where page-based information is obtained by crawling and processing content from some designated web site.

Figure 14:
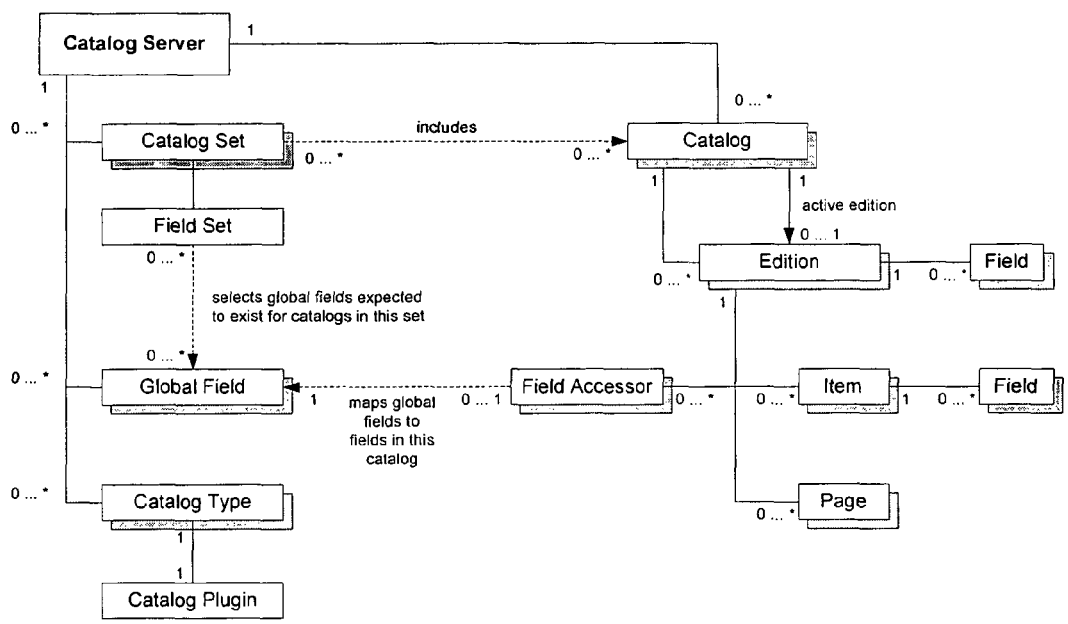
FIG. 14 shows the conceptual (and object) Catalog Model used by the invention for catalog management.

The Catalog Model is shown in FIG. 14. The conceptual (and object) model used by IntelleCat for catalog management consists of familiar concepts from the "real-world" of procurement catalogs.

Multiple Catalogs can be installed into an IntelleCat system. Each catalog may be "on-line", which makes it available for searching, or "off-line". Each catalog can have multiple editions. Catalogs contain Items and Pages and there is a many-to-many relationship between them The "off-line" mode allows administrator to work on the catalog and makes the catalog available for retrieval of previously stored references, but will not use the catalog in new searches.

Editions correspond to new printings of a traditional paper catalog, where some information is updated, some added, and some removed. Multiple editions can be available for a given catalog at the same time, but only one of them is designated as "active". IntelleCat always searches the active edition of a catalog, and attempts to use the active edition to show information about previously purchased items. However, if the active edition does not have the item or page requested, the stored reference includes the number of the edition from which the original reference came. This allows IntelleCat to access older editions of the catalogs and retrieve information no longer available in the up-to-date catalog.

Pages are generally used for presentation, while Items are specific purchasable units. In a traditional paper-based catalog, some pages may contain multiple items, some may feature only one item, and some may contain ordering instructions and have no purchasable items listed. The same is true about any other type of page-based catalog (such as an e-commerce web site). To support this, IntelleCat catalogs contain both, Items and Pages, and there is a many-to-many relationship between them.

Items and Pages are identified by their respective IDs. IntelleCat places no restrictions on the form of these IDs. It is up to the plug-in to determine what form each ID takes and how it maps onto information in the catalog data source. For example, CIF catalog plug-in can use Supplier Item ID in the CIF file as a unique item ID. Similarly, a Web catalog users a URL as a unique page IDs. The goal of this ID mapping is to ensure that IDs stay the same from one edition to another, thereby enabling IntelleCat and its users to make use of the stored knowledge about products in this catalog.

Each subsequent edition is assigned an integer number in ascending order. Even if an edition is deleted, its number is never used again, so item and page references that for a specific edition never become ambiguous. Vendors may issue catalog updates come incrementally or as a complete replacement. In either case, IntelleCat maintains a complete image of all items and pages in the most recent edition. The other editions are stored using reverse deltas to minimize space utilization. Older editions can also be archived to separate storage. IntelleCat also provides the administrator with tools to analyze the changes from one edition to the next and determine what to do with stored references that no longer point to valid items or pages in the most recent edition.

A catalog in IntelleCat corresponds to a catalog received from a particular vendor or a distributor that includes information from many vendors into one catalog. The types of products within one catalog are generally uniform. For example, a company can have an Office Supplies catalog and possibly a separate Office Furniture catalog. At the same time, a company might have a catalog for Vacuum Lifting Equipment, or Chemical Products, or some other industrial catalog from which the company might by products for the direct spend. In other words, the set of all catalogs a company buys from generally will have a number of well separated subsets, where a particular person in the company will tend to buy from catalogs in one subset and not from the others.

IntelleCat recognizes this with a concept of Catalog Sets. It is very hard to rely on a vendor to properly categorize items in their catalog according to some standardized scheme (UNSPSC for example). However, a site administrator should be able to relatively easily place a given catalog into one or another set of catalogs, for example: Maintenance, Production Line MRO, Catalysts, and so on, depending on the buying patterns of the particular site.

When searching for a product, IntelleCat allows users to select which catalog set they are interested in (or to select all sets). This cuts down on the number of irrelevant matches that just happen to contain the same words but in an entirely different context. Catalog Set preference is stored in the user's profile.

IntelleCat allows catalogs to define fields with Catalog scope and Item scope. These constitute the Catalog Schema. For example, currency symbol and vendor name might be defined in the Catalog scope, while price, description, and manufacturer name might be defined separately for each item. Fields can be of one of several types. TEXT, DATE, NUMBER, BOOLEAN, and URL are supported at this time, but additional types might be added as needed.

IntelleCat makes no assumptions about the number, names, types or even presence of fields in any catalog. When fields are available, IntelleCat uses them. However, if fields are not available, IntelleCat will still operate correctly, but the user might be required to enter more information manually when adding an item from this catalog to their requisition. The only field truly required for an item is the ID, and even that can be of arbitrary format.

Figure 15:
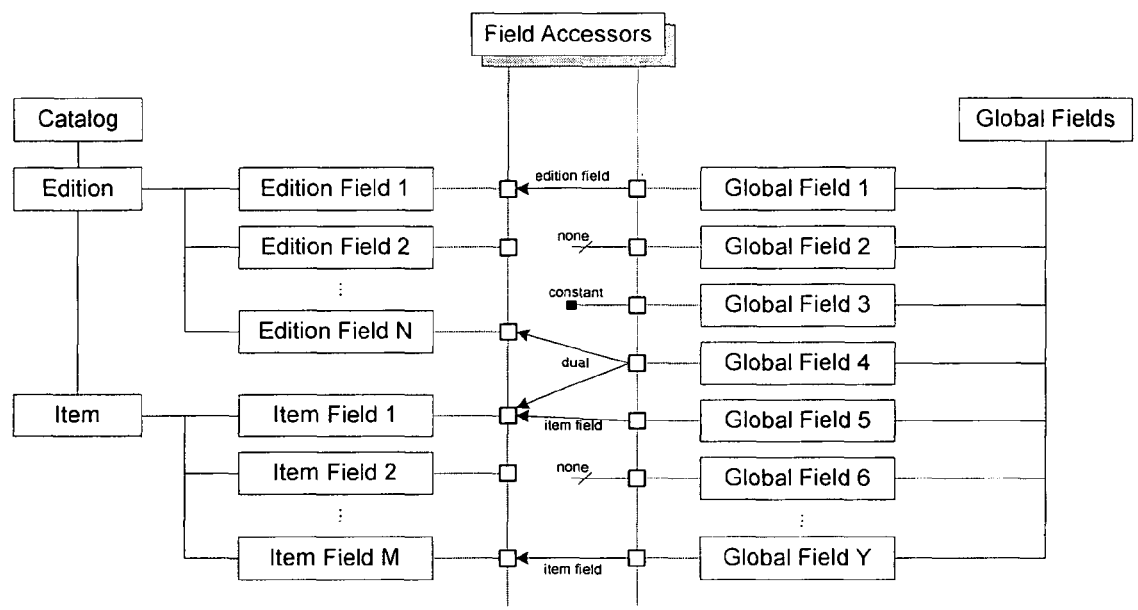
FIG. 15 shows the set of field mappings for each catalog in the system of the invention.

While IntelleCat allows Catalog Schema to be almost arbitrary, it still needs a way to extract programmatically useful information from the catalogs. This is accomplished by specifying a set of field mappings for each catalog in the system, shown in FIG. 15. The mappings are done to a Global Schema that is defined by the administrator of the site. It consists of a set of Field Accessors, that specify how a given Global Field can be obtained from an Item of a given catalog. The accessor can map to an Item-scoped field, a Catalog-scoped field, or a constant value. It can also include any combination of the mappings, in which case IntelleCat will first check to see if the specified Item-scoped field is available, then check the edition-scoped field, and finally take the constant value.

The Global Schema is a flat list of fields that are defined for a particular. IntelleCat installation, and to which fields from all catalogs are mapped. There is a default set of fields, but the administrator can add additional fields. The default set of fields mirrors fields available in CIF files used by Ariba. Most record-based catalogs should have equivalents to these fields available for mapping.

Global Field names follow a hierarchical doted notation, where each further part of the name specifies the field more and more. This lends itself to an outline-style display, which is very useful when large number of fields is present and need to be mapped.

TABLE 5 lists all of the standard fields pre-defined in an IntelleCat server:

TABLE 5

| Name | Label | Type | Description |
|---|---|---|---|
| item.aliases | Item Aliases | TEXT | Alternate names for the item |
| item.availability.leadtime | Lead Time | TEXT | Lead time required for ordering of this item |
| item.availability.territory | Territory | TEXT | Territory for which this item is available |
| item.code | Code | TEXT | Item categorization code |
| item.code.format | Code Format | TEXT | Format of the item categorization code (such as UNSPSC) |
| item.id.mfg | Mfg Part Number | TEXT | Manufacturer part number for this item |
| item.id.supplier | Supp. Part Number | TEXT | Supplier part number for this item |
| item.mfg.name | Mfg Name | TEXT | Name of the manufacturer of this item |
| item.name | Item Name | TEXT | Short item description (typically one line) |
| item.price.contract | Contract Price | NUMBER | Negotiated price of the item |
| item.price.currency | Price Currency | TEXT | Currency in which the prices are specified |
| item.price.list | List Price | NUMBER | List price of the item |
| item.price.units | Price Units | TEXT | Units of measurement in which the prices are specified |
| item.supplier.id | Supplier | TEXT | Identifier for the supplier of this item |
| item.supplier.id.duns | Supplier in DUNS | BOOLEAN | Identifier for the supplier of this item is specified as DUNS number (T/F) |
| item.url.mfg | Mfg. URL | URL | Manufacturer URL for further details on this item |
| item.url.supplier | Supp. URL | URL | Supplier URL for further details on this item |
| record.date.effective | Effective Date | DATE | Date on which this record becomes effective |
| record.date.expiration | Expiration Date | DATE | Date on which this record expires |

In addition to the fields defined at the server level, additional fields can be defined for individual catalog sets. Whether or not a Global Field is defined (server-wide or in a catalog set), does not prevent a catalog from providing a mapping for that field. The definition serves to help administrator to setup the mappings by providing outlines and drop-down lists of available fields to map to.

When a new catalog is added to the IntelleCat instance, administrator needs to:
  Create the catalog
  Create the first edition
  Set data loading parameters
  Load the data into the edition (done asynchronously, might take some time)
  Make the new edition active
  Place the catalog on-line Optionally: save the edition as a Template, from which all new editions for this catalog will be created.

When a catalog update is received, the administrator needs to:
Create a new edition
Adjust the data loading parameters as needed
Load the data into the new edition (done asynchronously, might take some time)
Make the new edition active
Optionally: remove one or more old editions from the server (archive or delete).

Figure 16:
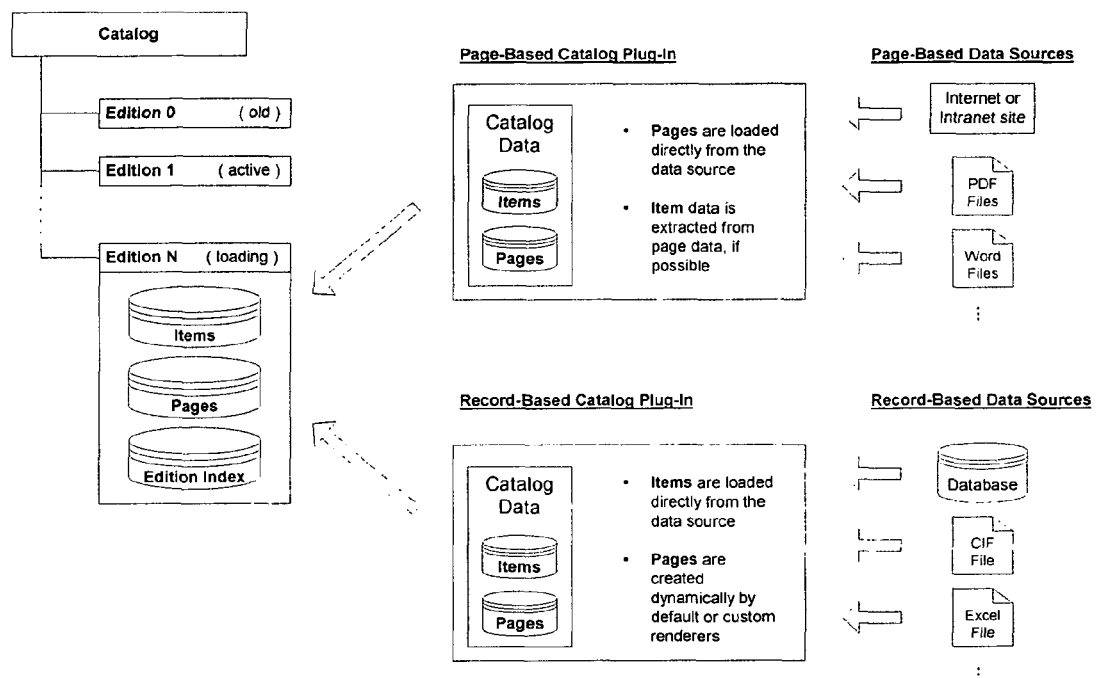
FIG. 16 shows an administrative screen that illustrates the process of creating and loading editions for catalogs of different types, and also the role of catalog plug-ins.

IntelleCat provides administrative screens that combine a number of these steps and make them easy to perform. The process of creating and loading editions for catalogs of different types, and also the role of catalog plug-ins, is shown in FIG. 16.

The search engine supports the caching of vendor web pages inside the customer's firewall as a configurable option. Some customers want this feature, because real-time browsing of the customer's web site can reveal purchasing patterns that the customer might not want revealed.

If the pages are cached, a daemon process checks the cached pages against the web site to make sure they are still valid. The actual pages are cached, in order to better protect against net congestion and web site outages. Note that this update daemon process needs a web site ID on many of the vendor sites in order to access the actual vendor pages. Assembling the appropriate ID for each site is included as part of the cached data.

In the general sense, data can be thought of as multi-dimensional tuples, where both the data in and number of dimensions varies. There is an original data tuple, and at least one key defined. Data enrichment must relate to the original key(s), else there is no way to offer the enrichment data back to the original source in any kind of coherent manner.

Organic growth of data is a key concept of NVSI that is implemented in IntelleCat. All relevant data may not initially be known or present. Over time, related data accumulates. The exact manner and relationship of the accumulated data is often unpredictable, which makes it virtually impossible to pre-define a schema into which to 'fit' the data.

The IntelleCat subsystem operates in conjunction with the search engine module to capture and retain products selected by users and the path taken to reach them. This is how IntelleCat builds the trees that provide for easy and fast navigation to the desired products.

The IntelleCat module is designed to remember a user's pervious successful search patterns. It accomplishes this via an organic tree-based structure, which recognizes that users shopping for something matching "pump vacuum millitor" and "pump vacuum roughing" are searching for similar items, in that the base of "pump vacuum" is the same, but the two searches branch at this point and head toward different refinements of this base search.

The IntelleCat subsystem stores the different branches of this tree structure in a tree-based structure called the Master Tree Space. The Master Tree Space consists of a set of directed graphs (trees) consisting of numeric tokens. Another IntelleCat component, the Master Dictionary, is responsible for mapping these numeric tokens to the actual words.

Using the Master Dictionary to uniquely map words to numeric token accomplishes two purposes. Firstly, it conserves space. Since each numeric token is three bytes long, much shorter than the average term in the search strings, storing the assigned three byte token for the word "microtorr" each time it occurs in the tree space is much more efficient than storing the word "microtorr" itself. Secondly, it allows the IntelleCat component to make more intelligent mappings between different languages, so that someone searching for a pump in German will be able to benefit from similar searches done in English.

The Master Tree Space and Master Dictionary are responsible for the actual physical storage of the tree space and associated products (leaf nodes), and for the concurrency, integrity, recoverability, and logging of all activities within the Master Tree Space. Other components of the IntelleCat system are responsible for populating the tree space, allowing it to evolve as the system learns more about the users' search patterns and the product space, and allowing the user to navigate through the different branches and re-use successful search patterns.

Other background processes, known collectively as the Evolution Manager, manage the ongoing integrity of the tree space and search for ways to simplify the structure of the tree space in order to make products more easily accessible to the end user, by either compressing or expanding the tree in order to better present the products found within it.

In the former case of maintaining integrity, the Evolution Manager searches for leaves (product pages) that don't exist or are out of date, and determines the appropriate action to take. Examples of appropriate actions may be to remove the leaf, remove the entire branch if there are no other valid leaves, or send an email prompting an administrator or other decision maker for action.

In the case of simplifying the tree structure in order to make products easier to find, the Evolution manager attempts to identify and take action on three cases: the synonym case, the leaf-heavy case, and the leaf-sparse case.

Synonyms occur when two branches are identical except for one term, in which case the two differing terms may be synonyms.

The leaf-heavy case occurs when a branch contains too may leaves to be useful. In leaf-heavy situations, the Evolution Manager attempst to find suitable sub-branchings and prompts an administrator or other decision maker to accept these new auto-generated branchings, create other new ones, or leave the tree as it is.

The leaf-sparse case occurs when a tree or sub-tree has several branchings but very few actual leaves. In this situation, it may be possible to aggregate the leaves up to higher branch levels and prune the unneeded lower branches. This results in products being available to users for fewer navigation clicks through the forest.

All of these functions have administrative interfaces. The Master Tree Space has an administrative function to allow properly permissioned users to add, move, remove, or otherwise modify branches and leaf nodes. The Check-In Daemon and Evolution Manager have certain functional configuration parameters, as well as operational configuration parameters. All are configurable from a point of view of distribution and both supply means of remotely monitoring the performance and health of the system.

Figure 17:
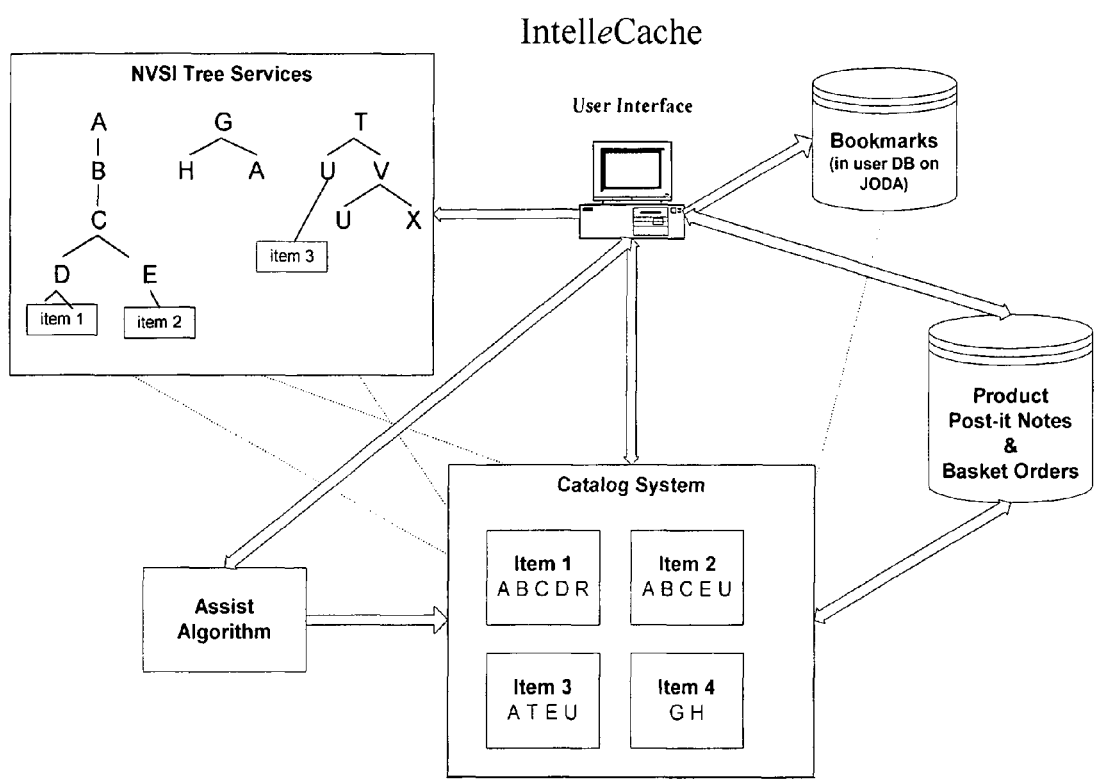
FIG. 17 shows how the system of the invention relates to the underlying NVSI technology.

IntelleCat is built on top of NVSI tree manifolds, as shown in FIG. 17.

The Master Tree Space provides an underlying data structure for all find trees (including root, branch, and leaf nodes).

The master tree space is the primary data structure used in IntelleCat, and the NV SI data manifold. It consists of a master tree dictionary (not to be confused with the master dictionary) that provides the mapping between tokens and the corresponding specific trees, the 'forest' of trees, and all the various APIs supporting master tree space operations.

Master tree space APIs include: Searching, reading, updating, inserting and deleting from the master tree dictionary; reading, updating, inserting and deleting individual trees, implementation of the check-in daemon (primarily this consist of processing updates from the check-in queue), and maintenance tools to operate on the entire data set (such as backup & restore, optimization, and space allocation).

Because IntelleCat supports creation of an arbitrary tree structure, it is possible for a given token to exist in multiple places, including multiple places in the same tree. This is true for branch nodes as well as leaf nodes. The tree-building logic trees does not know that there may be nodes with identical tokens in nearby semantic space. A daemon process runs in background to condense redundancies in the tree by modifying the tree to merge identical branches.

Note that we are distinguishing such modifications of the tree from 'recombining' branches, as the latter would imply that a single node (branch or leaf) could have more than one parent. IntelleCat builds data structures that assume one and only one parent for each node, with the exception of a root node that has no parent.

More than one path can result in the same part. However, this must be distinguished from more than one path leading to the same leaf node (termed Recombining Trees). N different paths could lead to N different leaf nodes, but all N leaf nodes may refer to the same part. This implies that leaf nodes should contain only a reference to part data, with all of the actual part data contained outside the leaf node. For example, part metadata includes how many times the part has been ordered. When that value is incremented, we don't have to search the entire forest for all leaf nodes that reference the part in question in order to update the purchase count.

In the process of building the semantic trees, the buyer may indicate synonyms (which is the equivalent of introducing an OR function to the existing AND and AND NOT functions of the tree.) For example, a user could say:
PUMP (implied AND)
   VACUUM (implied AND)
      TURBOMOLECULAR, XYZ, WHATEVER (implied OR)
         WATER COOLED (implied AND).

The OR function allows a user to pull up a full set of items called different terms by different vendors but which mean the same thing (e.g., one vendor uses the term 'TURBOMOLECULAR', another 'XYZ', another 'WHATEVER' but all of them are equivalent items.

The user is able to see which buyer built the paths that they are using, and to selectively see only paths that a specific buyer built or only see paths that an expert-level buyer built.

Branch data fields include: Creator user ID, Creator type, Create date, Read count, Update count.

The Master Dictionary assigns each descriptor (noun or adjective used to describe a part, e.g. pump, vacuum) a number that gets stored in relevant find-tree nodes.

The master dictionary defines the relationship between numbers and their corresponding tokens in the master tree space of trees. It also contains a pointer to the root node of the find- tree (if any) that begins with that token.

Given this distinction, the master dictionary itself is relatively simple. Whenever a keyword (token) is added in to tree, a request is made of the master dictionary for the number (key) corresponding to the token. If the token is already in the dictionary, its number is returned. If the keyword is not in the dictionary, the next available number (key) is generated and returned, and the new token is added.

In order to serve a globally distributed corporation, IntelleCat has to maintain synchronized instances of the master tree space that are geographically distributed over multiple countries, time-zones and languages.

The Spell Checker provides automatic spelling check for user-entered descriptors, populated with words from the existing catalogs. The spell-checker may be automatically accessed during certain operations. For example, suppose a user creates a new search tree and checks it in. The spell-checker is invoked to determine if the user has actually misspelled the root of an existing tree, rather than simply create a new tree.

Tree Spaces

The search and find knowledge in IntelleCat is stored in a tree structure, and the terms in the search string are the branch points in the tree. A branch node may have one or more terms below it, as well as one more previously purchased products. The storage and navigation services for this tree are provided by NVSI.

What this means, from a functional point of view, is that when the user begins the search process, he or she is asked, "what are you shopping for?" This is the prompt to type in the first search token, which becomes root of the tree that the user is navigating. As more terms are added to the search string, the user moves from the root to the branches, and finally to the leaves as he or she asks to see the results of the search.

The branching effect of the tree comes in to play when a user searches through the same path as a previous user, say find "A, B, C", but then moves off in a different direction when the two search strings diverge, say "A, B, C, E" instead of the previous "A, B, C, D". At C, there was a branching point. The UI offered the user the opportunity to search for "A, B, C, D", thus making the knowledge reuse the easiest path, but the user decided that he or she wasn't looking for "A, B, C, D", but "A, B, C, E", and so a new path was created.

When the user clicks on "find", one of two possible things will happen. If the current branch, say "A, B, C, D" was a previously existing branch, with previously existing products under it (as the "leaves" of the branch), then these leaves will be displayed, and the user can select one of these to add to his or her order. If the previously found products displayed do not show what the user is looking for, the user can choose to search the entire catalog with the given search string, "A, B, C, D". Any new products found and purchased in this way will then become a previously found product, listed among the other leaves for that branch.

Similarly, for the second possibility, if the current branch, say "A, B, C, E" is not a previously existing branch, then the user will automatically be shown the results of a search of the entire catalog given the search string, "A, B, C, E". In the same way as above, if a product is found and purchased as a result of this search, this product will be added to the tree at the branch node corresponding to the search term, "A, B, C, E". In this way are new branches and new leaves created.

The next time a user comes in to the system and enters "A" as the root term in response to the question, "what are you shopping for", he or she will be able to navigate down to "A, B, C". At this point, he or she will be offered the choice to navigate to "A, B, C, D" or "A, B, C, E." That is, he or she will see a tree in which the terms, "A, B, C" are displayed, and under that the options "D" and "E" are listed. Navigation to "D" or "E" is a simple mouse click.

The question remains, given a particular branch, say "A, B, C", how does the user actually create the new branch, now "F", if it is not listed amongst the navigation choices? Two possibilities: the user types it in, or IntelleCat suggests it. The former is straight forward, and only requires an input box to implement. The latter is more complicated, and represents another form of knowledge extraction on the part of IntelleCat. What happens is the user is offered the option to navigate to "D", "E", or "other." If the user clicks on "other", then IntelleCat looks at the current search string, looks at the catalog items that match said string, and applies algorithms to determine what tokens would be most effective in narrowing the search.

Lastly, we should note that when the user enters a new root term to begin a new search, the entire tree space is searched to try to find possible contexts for this term. If the term exists as a root or branch of an existing tree, the user is prompted to select the starting point for the search. This encourages the user to stay within the existing knowledge base, thereby helping to containing the complexity of the tree space while offering the user easier access to pre-existing successful finds.

The IntelleCat application makes use of two tree spaces: a user tree space and the master tree space. The implementations of each are the same; the difference lies in how they are used.

The master tree space contains the captured information about all of the successfully purchased products, and the find paths to these products, throughout the organization. So, if a user at one site finds and purchases product X, all the users at all of the other sites will be able to follow the same path to purchase product X. The creation and maintenance of this tree space is an automatic function of the procurement process, though there are also explicit admin hooks into the space for manual maintenance. In particular, users are allowed to publish branches without first purchasing products under these branches.

The user tree space contains local additions of temporary branches that are of explicit interest to a particular user. These local branches have no purchased product leaves under them; otherwise they would be in the master tree space. They are saved to the user's local tree space when a user creates branch, does not purchase anything under this branch, but nonetheless wants to remember how to get back to the branch. The user has the option to explicitly save this branch in his or her local tree space.

During the ordering process, the user may encounter catalog pages that are unstructured, in that they do not contain programmatically accessible fields for item price, item part number, or item description. A typical example is an e-commerce website, where the catalog pages are web pages that, while they present a much richer content from the user perspective, are opaque to external applications. In these cases, the user must manually enter the information on the items that they are purchasing. Once this information is entered, it is not lost; the IntelleCat application saves it so that it can be made available the next time a user visits the same page. Since there may be several items on a particular web page, IntelleCat allows a user to either select an existing known item for a page or enter a new one. These items (User-defined Catalog Items) are saved in a separate database that associates items with catalog pages.

The design of the IntelleCat module (which maintains a dictionary of vendor part numbers and descriptors along with mappings to local customer part numbers and descriptors) is further explicated here.

At some point in the shopping process, a corporate part number is assigned to a requisition. In considering the case of an end-user creating a requisition, either directly via the Ariba system or indirectly through IntelleCat, there are four possible scenarios:

The cross-reference dictionary contains information relating part numbers at the different customer sites to vendor part numbers. This information is captured during the purchasing process, either by the end-user or by the purchasing agent. Relationships between data in the cross-reference dictionary are very useful to the customer. Multiple parts numbers referring to the same vendor part reveals common purchasing between sites (useful to corporate purchasing for negotiating pricing). Multiple vendor part numbers referring to the same customer part number indicates equivalent parts, and suggests synonyms if the vendors refer to their parts differently.

Corporate purchasing can use the cross-reference dictionary to help determine purchasing patterns across all divisions. For example, corporate would like to see all purchases of a certain product, regardless of location. If different sites have different purchasing systems, this would not be possible. By cross-referencing the different local part numbers to common vendor part numbers, such patterns can be detected.

Cross-reference information is not stored in leaves; it's stored in a separate data structure. Ultimately the cross-reference data is in a fully normal form. The requisition screen captures both the internal and the manufacturer (vendor, distributor) part number. The term vector is used as a first pass for the local specification for the part, combined with the location term. Successive paths capture extra information.

The following workflow steps are used to establish a relationship between an internal part number and a vendor or manufacturer part number:

1) The user finds the desired item and creates a requisition. In the normal workflow process of approving the requisition, local purchasing personnel 'enrich' the requisition with the local site's part number.
2) The user's item is below their purchasing threshold, so the requisition is automatically sent through to the vendor. Assignment of the part number to the requisition would not occur until the part arrived from the vendor, at which point it would be attached to the requisition when the item was entered into inventory.
3) Similar to #2 above, except that the item is not warehoused, such as a box of pens from Staples. In this case, a local part number would never be assigned. 4) The end-user knows the local part number, and attaches it directly to the order.

A daemon process is able to identify synonyms and modify the trees accordingly. Entries in the master dictionary display the oldest term as the root, and all synonyms for that root are indicated as synonyms. Note that as the oldest term isn't necessarily the appropriate word for the root synonym, the administrator is able to edit the master dictionary in order to change the root. The tree is updated in response to such a modification.

User Management encompasses all aspects of creating and deleting users, granting them privileges, and maintaining customized profile settings. The module also allows the other modules in the application to authenticate users and check user authorization for particular functions.

Figure 18:
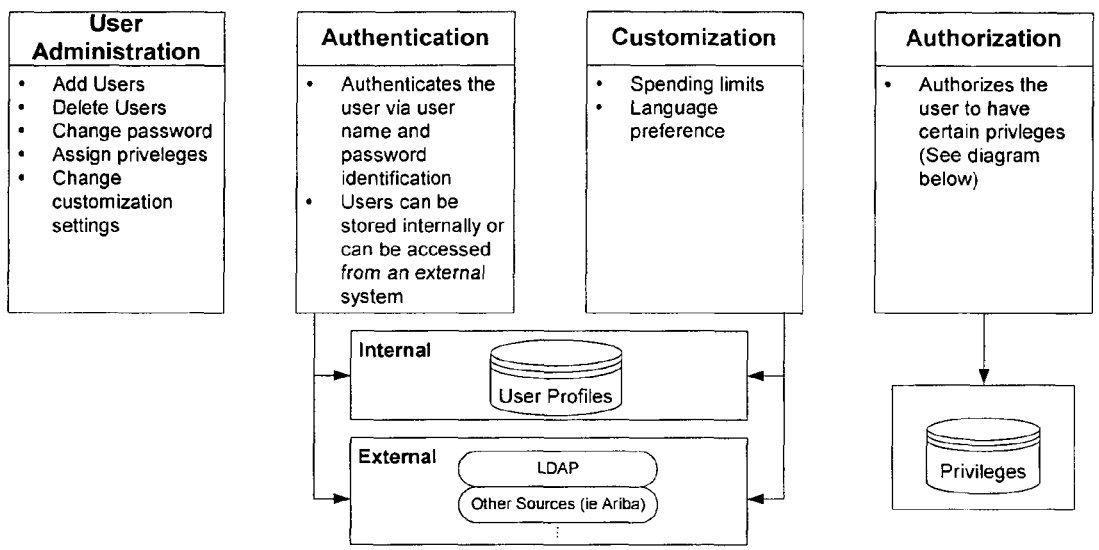
FIG. 18 shows the components of the User Management subsystem.

The User Management subsystem has a number of components. It provides support for all user administration operations—adding and deleting users, changing user passwords, assigning privileges and changing customization settings, as shown in FIG. 18.

The authentication module provides IntelleCat with ability to verify that the user is who they claim they are. The Authentication can be performed by verifying the user's password internally, or by comparing the user credentials with an external authentication system. This is accomplished via a plug-in that can connect IntelleCat with an external LDAP directory or another directory of users.

The customization module manages user profile settings used to modify how IntelleCat interacts with this particular user.

Figure 19:
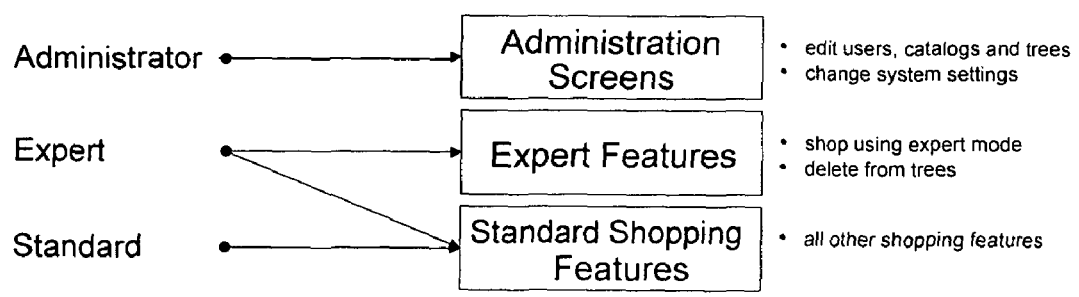
FIG. 19 shows the permission structure used by the system of the invention.

The authorization module is used by IntelleCat to determine who has access to specific IntelleCat features. FIG. 19 explains the permission structure used by IntelleCat.

Since Ariba and other programs maintain their own repositories of user information, the module includes support for an external authentication and customization data repositories. When enabled, it allows IntelleCat to utilize user and purchasing settings from another system to avoid data duplication.

Configuration information (bookmarks, local trees and other user-specific information) is stored on the server, never on local workstations. This ensures that mobile users will always have their current information available within the application.

The User Management subsystem has a number of components. It provides support for all user administration operations—adding and deleting users, changing user passwords, assigning privileges and changing customization settings. Implementation of the user profile consists of:
1) A small table containing essential information on the user, such as name, user name, user id, location, primary language and role.
2) An interface for the administrator to maintain the user profile data
3) An API to systems external to IntelleCat that may contain user profile information. This provides an automated mechanism to keep user data synchronized with other client systems
4) Shopping history and bookmarks. User bookmarks are considered to be a component of the user profile.

Customers enforce security through user profiles (IDs, passwords, permissions and roles) as well as through Partitions. Partitions are set up in Variants. There is a separate Variant for each ERP system and/or system version. Also, within each ERP version, if different approval rules are used, different variants have to be set up as well. User profiles are generally imported from each ERP system (version).

Certain functions are reserved for the administrator, such as setting installation-specific or global configuration values, and manual modifications of trees in the forest.

If an administrator deletes a branch or entire tree that contains a successful purchase, it is not actually deleted, but is made invisible. It is still included in reports on parts purchased in the past through the system.

The administrator is able to remove any item in the system, including:
  Master tree space sub-trees, up to and including an entire tree.
  Master dictionary entries.
  Published bookmarks (if we wind up supporting this)
  User bookmarks
  Local user sub-trees, up to an including an entire tree.

IntelleCat has the ability to prune trees. This is required for a number of reasons, such as a branch being mistakenly created by a user, or if the administrator wants to steer users towards certain items and/or away from other items.

If a branch exists but has never been used to order an item, it will actually be deleted when pruned. The administrator is not 'warned' in this scenario.

After links are established, they periodically need to be changed. The client may want to change the preferred supplier for a certain part. Vendors may discontinue certain parts, change their part number or update their web site, thus invalidating some links. Vendors may go out of business altogether.

If a branch exists and has been used to order an item, the administrator can still delete it, but is warned by the UI that the branch has one or more leaves associated with it. In this scenario, the branch is not actually deleted, but is marked as 'hidden'. The 'hidden' flag prevents users and experts from seeing the branch in searches, but will still be referenced by the reporting mechanism.

A vendor profile includes vendor name, address, primary contact, how long they've had a relationship with Engelhard, and standard discount or discounts. Also included is the quantity the customer (buyer) buys from each vendor, but only in so far as such data is maintained within IntelleCat. Purchasing personnel are the primary users of vendor profile data.

IntelleCat maintains an evolving database of vendor profiles containing the current status of vendors (e.g. how much is bought from each vendor).

The Requisition module is concerned with completing the transaction. Once all needed products are selected, the user submits the completed requisition to the purchasing subsystem, which can be configured in a variety of ways. At the very least, the mini-purchasing system is included that supports the minimal functionality necessary for managing requisitions. It records the requisition and stores it in a file, where an external program can import it and further process it. The most common configuration is a live link to an external purchasing system. This is accomplished via a custom plug-in architecture. For example, a plug-in will be supplied that forwards the purchase requisition to Ariba for further processing.

This includes functions such as creating a requisition, adding items to a requisition, deleting items from a requisition, viewing contents of a requisition and updating the status of a requisition (for example, when it is complete and should be processed).

The purpose of the purchasing subsystem is to track the items in a user's order and submit these items back to Ariba, for example, when the order is complete. Therefore, it is one of the main integration points with the Ariba system. It is also an integral part of IntelleCat's knowledge capture process, as the act of submitting a requisition to procurement indicates that the items in the requisition were indeed what the user was looking for, and is therefore the trigger for committing the knowledge found in the knowledge creation process described above. This is consistent with IntelleCat's philosophy of seamlessly integrating knowledge sharing with the user's business process.

From the point of view of the knowledge capturing as it happens in IntelleCache, requisitions are created almost as a by-product of finding. Products are found, successful candidates are added to requisitions, their "find paths" duly noted, and the successful "find paths" are confirmed via the submit process. To the successful functioning of the system as a whole, however, the purchasing subsystem represents the actual goal of the user's activities within the system: the actual purchasing of items. Nonetheless, IntelleCat is not at present a full-cycle procurement tool, and the submission of a requisition represents the end of IntelleCat's involvement in the procurement lifecycle.

As a user browses through the pages available in IntelleCat, he or she will encounter two types of catalog data: catalogs whose items are line items which contain structured content, complete with pricing information and descriptions, and catalogs whose items are presented via an unstructured medium, such as web pages, PDF files, or other programmatically opaque media. While the web pages may provide richer content to the user, this content is inaccessible from the point of view of a program trying to determine what the product may be, how much it may cost, and how to order it.

Adding the former items (the structured, programmatically parseable items) to a requisition is a simple matter of selecting the item and telling IntelleCat to add it to the requisition. The latter items (the unstructured ones), however, require the user to manually enter the information from the web page or PDF file before adding the item to the requisition. When a user adds one of these to a requisition, IntelleCat pops up an information entry dialog to allow the user to copy and paste the information from the web page (or PDF doc, etc.) into the requisition.

Once certain pieces of information (i.e., pricing information, product number, product description, etc.) have been identified for an unstructured item, this information is made available to the user the next time they wish to purchase something from that same page. If, when they re-visit the page, they are looking to buy the same item as before, then they may choose to reuse the previously entered information. If, instead, the catalog entity (e.g., web page) contains multiple items, then they may choose to buy something different and enter new information. In this way, IntelleCat learns which items a web page contains, how much they cost, what their part numbers are, etc. As part of the knowledge-sharing feature of IntelleCat, this information is made available to the other users who also happen to visit these pages. Although the creation and maintenance of requisitions is not, as stated previously, the central point of IntelleCat, IntelleCat does come with a requisition system capable of performing the rudimentary tasks of adding, modifying, deleting, and viewing the items in a requisition.

Once the requisition is complete and the user clicks on "submit to procurement", IntelleCat's involvement in the procurement process is done, and it hands the requisition off to the third-party procurement system, e.g., Ariba. As this is just another interface to a third party system, however, the procurement package could as well be Commerce One, or any of the other major procurement vendors.

The functionality of the requisition (shopping cart) API is as follows.
Public Requisition Methods (required from IntelleCat):
1) Create new
2) Copy current
3) Print
4) Help
5) Comments
6) Retrieve all items
Protected Requisition Methods (not required from IntelleCat):
1) Delete
2) Withdraw
3) Submit?
4) Approval flow
5) History
Public data members in a requisition
1) Requisition ID
2) Requisition title
3) Total number of items (12 pencils is 12 total items).
4) Status (new, pending approval, approved, rejected, etc.)
5) Total cost
Protected data members in a requisition
1) Creator date (implied)
2) Creator ID (implied?)
3) Creation location (implied?)
4) Creation country (implied?)
5) Currency (implied by creation country?)
Public Item Methods (required from IntelleCat):
1) Add new item
2) Copy current item
3) Delete item
4) Change item attributes
5) View item details
6) View/edit comment
Public data members in a requisition item:
1) Item type (general enum)
2) Item unit (single, dozen, gross, gallon, etc.)
3) Quantity
4) Item unit cost
5) Total cost
6) Catalog/non-catalog flag
7) Description
8) Comment The Inventory module provides the ability to reference a near real-time feed from inventory so the buyer has an option to make soft-dollar purchases from a remote warehouse instead of having to buy a new item. It provides the ability to view current inventory and send update to inventory in event of soft-dollar purchase.

Inventory information comes from broadcasts from any commercial inventory-tracking tool regarding new items being added to inventory, as well as existing items being removed from inventory, and cache this data. This information is then 'tagged' to leaf node information in the IntelleCat leaf database, and available to anyone viewing leaf information. This does not provide a comprehensive inventory report, but an indicative inventory system that is still extremely useful.

The User Ordering History is a list of all parts the user has ordered in the past. It can be easily searched by at least one keyword, such as they keyword used to initiate a find-tree (e.g., pump).

If Bob in maintenance goes to order a pump, IntelleCat looks into his user history table even before it looks through the Master Tree List for pump.

All items a given user has ordered are stored in the user's purchase history. This is stored in the user's local space. Corresponding to this is a mechanism to view and find items previously purchased.

During the ordering process, the user may encounter catalog pages that are unstructured, in that they do not contain programmatically accessible fields for item price, item part number, or item description. A typical example is an e-commerce website, where the catalog pages are web pages that, while they present a much richer content from the user perspective, are opaque to external applications. In these cases, the user must manually enter the information on the items that they are purchasing. Once this information is entered, it is not lost; the IntelleCat application saves it so that it can be made available the next time a user visits the same page. Since there may be several items on a particular web page, IntelleCat allows a user to either select an existing known item for a page or enter a new.one. These items are saved in a separate database that associates items with catalog pages.

Product annotation is enabled via the post-it note functionality, which allows users to annotate products with comments, recommendations, warnings, etc. These notes are available to the user via the known products page, and are saved in an object database responsible for mapping then catalog items to the annotations.

In some cases, different parts from different manufacturers (vendors) will be equivalent (fungible), but in other cases, different parts are not found to be equivalent. This information is only discovered through trial and error, but could come to represent a significant knowledge base among the company's employees (customer users). Product Annotation enables IntelleCat to record this information.

The user also has the ability to bookmark favorite find trees (named searches), publish them to a broader audience if desired, and delete personal bookmarks that are no longer relevant.

There are two types of bookmarks. One is 'favorites', which refers to completed searches in the master tree. The second type are references to partial, locally saved searches. Bookmarks are not so much knowledge sharing as knowledge capture, as a user will only ever be able to see his or her own bookmarks. They are therefore stored as a part of the user profile in the user database. Bookmarks are a fairly common idea in the industry, and need not be discussed in detail here; it suffices to note that a user may bookmark a particular product or catalog page for later reference.

Daemon Processes are a major category of IntelleCat components, which consists of a number of special-purpose processes called 'daemons' that operate in background mode. They provide the following functionality:

Maintaining a dictionary of terms and identifiers that allow the system to recognize 'synonyms' (e.g. "smp" is a synonym for "sump");

Maintaining a cross-reference dictionary of vendor part numbers and local Engelhard part numbers;

Continually looking for redundancies in trees, cleaning and pruning tree branches;

Continually scanning vendor leaf nodes and sending exception reports to Purchasing (e.g. prices that have changed, pages that have disappeared) so searches may be repaired. Or maybe we'll just repair searches without any emails to people in Purchasing;

Providing automatic reports to Purchasing (e.g. last price paid for a part, number of items purchased from a specific vendor, and rate of purchase);

Providing automatic in-house inventories (provided access is enabled to local inventory systems);

Maintaining individual user search profiles;

Maintaining an evolving database of master searches containing published searches available to all users;

Maintaining an evolving database of vendor profiles containing the current status of Engelhard vendors (e.g. how much Engelhard buys from each vendor), but only in so far as such data is actually maintained within IntelleCat.

The Master Tree List Optimization Daemon continually looks for 'redundant' tree branches, caused by synonyms (e.g. Sump=Smp), and 'dead' tree branches, created inadvertently by users, in order to clean and prune.

The Page Refresh Daemon continually scans vendor leaf nodes, compares them to on-line vendor pages, and sends exception reports to Purchasing (e.g. prices that have changed, pages that have disappeared) so that find branches may be repaired.

The Check-In Daemon (CID) allows the user to save successful product searches in the master tree structure. The (CID) integrates new and changed trees back into the master tree space of trees (forest). This is one of the explicit NVSI components in the IntelleCat implementation. Insertion of new trees, or new branches on existing trees, into the Master Tree Space is the responsibility of the Check-In Daemon. This happens as discussed previously: a user enters a search vector, finds a product, and makes a purchase. As a result, the Check-In Daemon checks the branch defined by the search vector into the Master Tree Space and attaches to it a leaf node corresponding to the new product. Subsequent users searching for similar items will find the previously successful path and be able to follow it to the saved leaf node (product). Note that the Check-In Daemon also handles root and branch nodes under other circumstances. The Check-In Daemon is also responsible for resolving distributed update conflicts, distributed configuration, and replication issues.

The Common Part Integration Daemon seeks to find and aggregate information on parts that differ only by a trivial attribute, such as a numeric value. For example, the 120-Ohm resistors of a certain class are only trivially different from 150-Ohm resistors of the same class. Where possible, nodes for trivially different items are combined such that they have a common parent.

Consider the end-shopping scenario. A customer is looking for vacuum pumps. We may have found the best page for finding all vacuum pumps that exists on the Internet. But when the user selects the specific model and buys it, perhaps only the very last page with the particular pump is stored in the leaf node. So we have in effect only remembered how to shop for "a 75 millitorr vacuum pump", not for "vacuum pumps". The former is decidedly less useful than the latter.

To address this issue, IntelleCat supports drop-down lists containing the numeric ranges of different models, and captures the leaf node that contains the general list for millitorr vacuum pumps. A background daemon checks for things that differ only in numeric ranges, accumulate the common page and adjust the tree.

The purpose of the Purchasing Subsystem is tracks the items in a user's order and submits these items back to, for example, Arib,a when the order is complete. Therefore, it is one of the main integration points with the Ariba system. It is also an integral part of IntelleCat's knowledge capture process, as the act of submitting a requisition to procurement indicates that the items in the requisition were indeed what the user was looking for, and is therefore the trigger for committing the knowledge found in the knowledge creation process described above. This is consistent with IntelleCat's philosophy of seamlessly integrating knowledge sharing with the user's business process.

From the point of view of the knowledge capturing as it happens in IntelleCache, requisitions are created almost as a by-product of finding. Products are found, successful candidates are added to requisitions, their "find paths" duly noted, and the successful "find paths" are confirmed via the submit process. To the successful functioning of the system as a whole, however, the purchasing subsystem represents the actual goal of the user's activities within the system: the actual purchasing of items.

IntelleCat has a number of specific APIs, shown along with their NVSI counterparts, in TABLE 6.

TABLE 6

| | IntelleCat & NVSI APIs: | | | |
|---|---|---|---|---|
| Function | IntelleCat Description | IntelleCat Parameters | NVSI Description | NVSI Parameters |
| Create dictionary | Mapping is words-to-numbers; numbers are stored | NDS description | Based on nodes (NDS) | NDS description |

TABLE 6-continued

IntelleCat & NVSI APIs:

| Function | IntelleCat Description | IntelleCat Parameters | NVSI Description | NVSI Parameters |
|---|---|---|---|---|
| Delete dictionary | in the tree | Dictionary ID | | Dictionary ID |
| Create tree space | Does this also create the dictionary for the space? | Probably fixed-length nodes | This is instantiation of NDS description? some data space. What happens when it fills up? | |
| Create tree | Creates the whole tree and also updates the dictionary | Entire tree node info | Creates a tree with only one node | root node data (and tree space info?) |
| Search for nodes | Retrieves array of tree ids and paths. Should support a number of search patterns. | Search string | Looks up item in dictionary. Other tree ops are a separate call? | NDS description |
| Retrieve node data | Retrieves node information for a particular node. | Tree ID and search string | Retrieves NDS, given NDS description | NDS description |
| Retrieve path | Retrieves a path (set of node information). Second search string assume to be root if null | Tree ID and two search strings? | Compound operation? Ie, multiple NVSI ops done for one IC op? | Multiple NDS descriptions |
| Retrieve tree | Retrieves an entire tree in one operation (useful for admin, debugging and tools). | Tree ID | Compound operation | Root NDS description |
| Update node data | Updates information at a particular node | Tree ID and search string | Updates NDS at a node | NDS description |
| Add path | Adds the passed path to the indicated tree | Path info, tree ID and search string (as starting point) | Compound operation? | Starting NDS plus additional NDS info |
| List trees | | Returns nodes of all roots? | Dictionary request? Needs nodes of all trees | Tree space info? |

The IntelleCat tree space is actually a combination of two types of trees. In any given tree space, there will be one dictionary and N semantic trees. The dictionary itself is a particular implementation of a tree.

In IntelleCat, we have a number of IntelleCat specific APIs. Currently that list includes the following:

1) Semantic Tree API,
2) Catalog Management API,
3) Purchase Information API,
4) Tree Rule API,
5) Search Rule API,
6) User Profile API,
7) JODA API,
8) Cross-Reference API.

These APIs actually span multiple APIs, because of the functionality provided by NVSI. For example, the purchase information API provides information about purchases. This information exists in more than one place, but the API aggregates it together. Some purchase information exists in the tree node data structures, such as the time of first purchase (or node creation), user ID creating the node, number of purchase since creation, time of last purchase, and total number of items purchased since creation. Other details about the purchases exist in JODA, and are part of the leaf pointed to by the tree node data structure. Thus the data is stored separately, but the purchase information API presents it together.

The Semantic Trees API provides access to create, navigate and administer the semantic tree structures. These trees record user created descriptions of catalog items and additional information about purchased products. In EnterBuyer, we can create commodity codes trees and possibly accounting code information using these same structures. This API also exposes statistical information about usage and buying patterns in relation to tree nodes. There are at least four different categories of data in the semantic tree APIs:

Schema data: Contains information describing the structure of the trees. Includes information on branches, parent.

Node information: This is information that is actually stored in the node, and is part of the node data structure. This includes such fields as create time, creator ID, last updated time, reference count and term (ID).

Reference information: This is information that is not stored directly in the nodes, but is referred to in the nodes. In other words, we're talking about pointers. For example, when a node is used to buy an item, the purchased item is not stored in the node, but a pointer to it is.

Path information: This is information relating to an entire path, not just a single node.

The Catalog Management API provides access to all catalog information (Catalogs, Editions, Items and Pages). The administration portion of this API provides functions for adding and removing catalogs, creating editions, making editions active, and so on.

The Captured Purchase Information provides access to information about purchased products, including first product purchase date, purchase frequency, total purchase count, etc. It also provides access to user comments on the products as well as a cross-reference table, which stores synonym information for products (such as different part descriptors used by different entities for the same product).

The Tree Rules API provides administrative access to the rules that determine how knowledge is captured in the semantic trees. For example, these rules control the circumstances under which tree paths will be shared and/or propagated between the different tree levels (user, trade group, location and global levels).

The Search Rules API provides administrative access to set up rules that establish preference between catalog and items within catalogs. This includes the ability to order or filter search results via a set of pre-determined rules, such as which items are most popular, which suppliers or catalogs are preferred, etc.

The User Profiles API provides access to customization information for various users, including language, location, security and catalog preferences. While many customers will configure their purchasing system to access user information via an LDAP server or other ERP system, IntelleCat still needs to store user-specific information, such as user's bookmarks, preferences, etc. This IntelleCat-specific information is stored in an object database, and access is provided via the user profile API.

A number of additional APIs allow IntelleCat to use external systems. The Catalog Plugin API (explained below) allows very flexible access to catalog data. The Authentication API allows IntelleCat to use an external source of user information (such as an LDAP server or an ERP system). The Web Crawling Service API can be used to access the web crawling component of IntelleCat.

What is claimed is:

1. A computer-implemented method for locating information in a collection of one or more electronic data stores, including:
    constructing by a processor a find-tree, which includes a tree composed of nodes and branches, having a root node, and some number of intermediate and terminal or leaf nodes, wherein each node denotes a single term used in a search, that is, in an attempt to locate information in said collection of one or more electronic data stores, and each branch denotes a connection between two nodes, such that each path in said find-tree represents a sequence of terms used in said search, and said find-tree represents one or more paths taken in said search, including alternative paths to the same information, partial or incomplete paths, and paths that lead to different information, so that said find-tree depicts one or more sequences of terms, including the intermediate steps, in which each sequence comprises a search path employed in finding, or attempting to find, information in said collection of electronic data stores;
    retrieving and navigating an existing said find-tree or any previous tree to locate desired information in said electronic data stores; and
    changing, augmenting or extending said find-tree at any point in the process.

2. The method of claim 1, whereby said find-trees include partial search paths, and complete search paths of varying lengths that terminate in nodes representing information, and are stored in a computer system.

3. The method of claim 2, whereby said stored find-trees are collected in shared data stores representing a master tree space that contains find-trees and groups of find-trees associated by criteria that define the relation among find-trees in the group, and enables at least one of storage and retrieval of the evolving connections between related found information, wherein said collection of electronic data stores include said shared data stores.

4. The method of claim 3, wherein the method further includes, for each said find-tree in said master tree space:
    removing branches;
    repairing broken connections, whereby leaf nodes that no longer correspond to found information are either removed or associated with other information;
    merging branches and trees that were created taking the same path to the same information, or that represent synonymous search terms, or both.

5. The method of claim 1, wherein the method further includes presenting a set of suggested search terms, wherein such terms are culled from said collection of electronic data stores being searched, including said find trees, and a set of candidate terms is constructed based upon one or more of: the characteristics of nodes in said find-trees that a term may be associated with, their relative proximity to other search terms, and the number of occurrences of said candidate terms, in said electronic data stores being searched.

6. The method of claim 5, wherein the presenting of said suggested search terms includes:
    receiving an initial query (search-term expression) composed of search terms linked by operators including one or more of AND, OR and NOT;
    expanding the initial query expression with one or more of: synonyms, acronyms and antonyms drawn from an evolving master dictionary, and filtered by context-dependent relevance;
    executing the said expanded query against at least one of said master tree space and said electronic data-stores.

7. The method of claim 5, wherein the presenting of said suggested search terms includes building said set of candidate terms by filtering retrieved information by a configurable relevance-threshold, determined by frequency of occurrence of search terms in the retrieved information.

8. The method of claim 5, wherein the presenting of said suggested search terms further includes:
    filtering said set of candidate terms to remove duplicates and kill-list entries;
    filtering said set of candidate terms by excluding terms with an average minimum proximity to search terms greater than a configurable threshold.

9. The method of claim 5, wherein the presenting of said suggested search terms further includes augmenting said set of candidate terms based upon the characteristics of nodes in said find-trees that a term may be associated with.

10. The method of claim 1, whereby information from said collection of electronic data stores is at least one of acquired, maintained or updated by interacting with said collection of electronic data stores, and storing retrieved information in a separate data cache, wherein said collection of electronic data stores includes said separate data cache.

11. The method of claim 10, whereby information from said collection of electronic data stores is further at least one of acquired, maintained or updated by:
    exploring said collection of electronic data stores for selected information;
    storing retrieved information in said separate data cache.

12. The method of claim 10, whereby information from said collection of electronic data stores is further at least one of acquired, maintained or updated by:

accessing information in said collection of electronic data stores about similar information previously available in said separate data cache;

accessing information in said collection of electronic data stores, to check for any changes from information previously available in said separate data cache.

13. The method of claim 10, whereby information from said collection of electronic data stores is further at least one of acquired, maintained or updated by:

accessing information in said collection of electronic data stores about similar information previously available in said master tree space;

accessing information in said collection of electronic data stores, to check for any changes from information previously available in said master tree space.

14. The method of claim 10, whereby information from said collection of electronic data stores is further at least one of acquired, maintained or updated by synchronizing information in said separate data cache with new or changed information.

15. The method of claim 10, whereby information from said collection of electronic data stores is further at least one of acquired, maintained or updated by synchronizing information in said master tree space with new or changed information.

16. A system for locating information in a collection of one or more electronic data stores, the system comprising:

a first storage device for storing information retrieved from said electronic data stores, and for storing a plurality of previously submitted find-trees;

a processor connected to the first storage device, with the processor configured for:

constructing a find-tree, which includes a tree composed of nodes and branches, having a root node, and some number of intermediate and terminal or leaf nodes, wherein each node denotes a single term used in a search, that is, in an attempt to locate information in said collection of one or more electronic data stores, and each branch denotes a connection between two nodes, such that each path in said find-tree represents a sequence of terms used in said search, and said find-tree represents one or more paths taken in said search, including alternative paths to the same information, partial or incomplete paths, and paths that lead to different information, so that said find-tree depicts one or more sequences of terms, including the intermediate steps, in which each sequence comprises a search path employed in finding, or attempting to find, information in said collection of electronic data stores;

retrieving and navigating an existing said find-tree or any previous tree to locate desired information in said electronic data stores; and changing, augmenting or extending said find-tree at any point in the process.

17. The system of claim 16, wherein the processor is configured for: storing in a computer system said find-trees, including partial search paths, and complete search paths of varying lengths that terminate in nodes representing information.

18. The system of claim 17, wherein the processor is configured for: collecting said stored find-trees in shared data stores representing a master tree space that contains find-trees and groups of find-trees associated by criteria that define the relation among find-trees in the group, and enables at least one of storage and retrieval of the evolving connections between related found information, wherein said collection of electronic data stores include said shared data stores.

19. The system of claim 18, wherein the processor is configured whereby the operations of the processor further include, for each said find-tree in said master tree space:

removing branches;

repairing broken connections, whereby leaf nodes that no longer correspond to found information are either removed or associated with other information;

merging branches and trees that were created taking the same path to the same information, or that represent synonymous search terms, or both.

20. The system of claim 16, wherein the processor is configured for: presenting a set of said suggested search terms, wherein such terms are culled from said collection of electronic data stores being searched, including said find trees, and a set of candidate terms is constructed based upon one or more of: the characteristics of nodes in said find-trees that a term may be associated with, their relative proximity to other search terms, and the number of occurrences of said candidate terms, in said electronic data stores being searched.

21. The system of claim 20, wherein the processor is further configured for:

receiving an initial query (search-term expression) composed of search terms linked by operators including one or more of AND, OR and NOT;

expanding the initial query expression with one or more of: synonyms, acronyms and antonyms drawn from an evolving master dictionary, and filtered by context-dependent relevance;

executing the said expanded query against at least one of said master tree space and said electronic data-stores.

22. The system of claim 20, wherein the processor is configured whereby: the presenting of said suggested search terms includes building said set of candidate terms by filtering retrieved information by a configurable relevance-threshold, determined by frequency of occurrence of search terms in the retrieved information.

23. The system of claim 20, wherein the processor is configured whereby the presenting of said suggested search terms further includes:

filtering said set of candidate terms to remove duplicates and kill-list entries;

filtering said set of candidate terms by excluding terms with an average minimum proximity to search terms greater than a configurable threshold.

24. The system of claim 20, wherein the processor is configured whereby the presenting of said suggested search terms further includes augmenting said set of candidate terms based upon the characteristics of nodes in said find-trees that a term may be associated with.

25. The system of claim 16, wherein the processor is configured whereby information from said collection of electronic data stores is at least one of acquired, maintained or updated by interacting with said collection of electronic data stores, and storing retrieved information in a separate data cache, wherein said collection of electronic data stores includes said separate data cache.

26. The system of claim 25, wherein the processor is configured whereby information from said collection of electronic data stores is further at least one of acquired, maintained or updated by:

exploring said collection of electronic data stores for selected information;

storing retrieved information in said separate data cache.

27. The system of claim 25, wherein the processor is configured whereby information from said collection of electronic data stores is further at least one of acquired, maintained or updated by:
  accessing information in said collection of electronic data stores about similar information previously available in said separate data cache;
  accessing information in said collection of electronic data stores, to check for any changes from information previously available in said separate data cache.

28. The system of claim 25, wherein the processor is configured whereby information from said collection of electronic data stores is further at least one of acquired, maintained or updated by:
  accessing information in said collection of electronic data stores about similar information previously available in said master tree space;
  accessing information in said collection of electronic data stores, to check for any changes from information previously available in said master tree space.

29. The system of claim 25, wherein the processor is configured whereby information from said collection of electronic data stores is further at least one of acquired, maintained or updated by synchronizing information in said separate data cache with new or changed information.

30. The system of claim 25, wherein the processor is configured whereby information from said collection of electronic data stores is further at least one of acquired, maintained or updated by synchronizing information in said master tree space with new or changed information.

31. A program product apparatus for locating information in a collection of one or more electronic data stores, said apparatus comprising: a computer useable memory with computer program logic stored therein, to enable the locating of information in said electronic data stores:
  a first storage device for storing information retrieved from said electronic data stores, and for storing a plurality of previously submitted find-trees;
  a processor connected to the first storage device, with the processor configured to enable said apparatus to:
    construct a find-tree, which includes a tree composed of nodes and branches, having a root node, and some number of intermediate and terminal or leaf nodes, wherein each node denotes a single term used in a search, that is, in an attempt to locate information in said collection of one or more electronic data stores, and each branch denotes a connection between two nodes, such that each path in said find-tree represents a sequence of terms used in said search, and said find-tree represents one or more paths taken in said search, including alternative paths to the same information, partial or incomplete paths, and paths that lead to different information, so that said find-tree depicts one or more sequences of terms, including the intermediate steps, in which each sequence comprises a search path employed in finding, or attempting to find, information in said collection of electronic data stores;
    retrieving and navigating an existing said find-tree or any previous tree to locate desired information in said electronic data stores; and
    changing, augmenting or extending said find-tree at any point in the process.

32. The apparatus of claim 31, whereby said find-trees include partial search paths, and complete search paths of varying lengths that terminate in nodes representing information, and are stored in said apparatus.

33. The apparatus of claim 32, whereby said stored find-trees are collected in shared data stores representing a master tree space that contains find-trees, and groups of find-trees associated by criteria that define the relation among find-trees in the group, and enables at least one of storage and retrieval of the evolving connections between related found information, wherein said collection of electronic data stores include said shared data stores.

34. The apparatus of claim 33, wherein the operation of the apparatus further includes, for each said find-tree in said master tree space:
  removing branches;
  repairing broken connections, whereby leaf nodes that no longer correspond to found information are either removed or associated with other information;
  merging branches and trees that were created taking the same path to the same information, or that represent synonymous search terms, or both.

35. The apparatus of claim 31, whereby performing the method further includes: presenting a set of said suggested search terms, wherein such terms are culled from said collection of electronic data stores being searched, including said find trees, and a set of candidate terms is constructed based upon one or more of: the characteristics of nodes in said find-trees that a term may be associated with, their relative proximity to other search terms, and the number of occurrences of said candidate terms, in said electronic data stores being searched.

36. The apparatus of claim 35, wherein the presenting of said suggested search terms includes:
  receiving an initial query (search-term expression) composed of search terms linked by operators including one or more of AND, OR and NOT;
  expanding the initial query expression with one or more of: synonyms, acronyms and antonyms drawn from an evolving master dictionary, and filtered by context-dependent relevance;
  executing the said expanded query against at least one of said master tree space and said electronic data-stores.

37. The apparatus of claim 35, wherein the presenting of said suggested search terms includes building said set of candidate terms by filtering retrieved information by a configurable relevance-threshold, determined by frequency of occurrence of search terms in the retrieved information.

38. The apparatus of claim 35, wherein the presenting of said suggested search terms further includes:
  filtering said set of candidate terms to remove duplicates and kill-list entries;
  filtering said set of candidate terms by excluding terms with an average minimum proximity to search terms greater than a configurable threshold.

39. The apparatus of claim 35, wherein the presenting of said suggested search terms further includes augmenting a set of said candidate terms based upon the characteristics of nodes in said find-trees that a term may be associated with.

40. The apparatus of claim 31, whereby information from said collection of electronic data stores is at least one of acquired, maintained or updated by interacting with said collection of electronic data stores, and storing retrieved information in a separate data cache, wherein said collection of electronic data stores includes said separate data cache.

41. The apparatus of claim 40, whereby information from said collection of electronic data stores is further at least one of acquired, maintained or updated by:
  exploring said collection of electronic data stores for selected information;
  storing retrieved information in said separate data cache.

42. The apparatus of claim 40, whereby information from said collection of electronic data stores is further at least one of acquired, maintained or updated ted by:
 accessing information in said collection of electronic data stores about similar information previously available in said separate data cache;
 accessing information in said collection of electronic data stores, to check for any changes from information previously available in said separate data cache.

43. The apparatus of claim 40, whereby information from said collection of electronic data stores is further at least one of acquired, maintained or updated by:
 accessing information in said collection of electronic data stores about similar information previously available in said master tree space;
 accessing information in said collection of electronic data stores, to check for any changes from information previously available in said master tree space.

44. The apparatus of claim 40, whereby information from said collection of electronic data stores is further at least one of acquired, maintained or updated by synchronizing information in said separate data cache with new or changed information.

45. The apparatus of claim 40, whereby information from said collection of electronic data stores is further acquired at least one of acquired, maintained or updated synchronizing information in said master tree space with new or changed information.

* * * * *